(12) United States Patent
Lee et al.

(10) Patent No.: US 11,651,172 B2
(45) Date of Patent: May 16, 2023

(54) METHOD AND SYSTEM THAT PROVIDES ACCESS TO CUSTOM AND INTERACTIVE CONTENT FROM AN OPTICAL CODE

(71) Applicants: Stephon Dwight Lee, Lawrenceville, GA (US); Clinton Rice, Lilburn, GA (US)

(72) Inventors: Stephon Dwight Lee, Lawrenceville, GA (US); Clinton Rice, Lilburn, GA (US)

( * ) Notice: Subject to any disclaimer, the term of this patent is extended or adjusted under 35 U.S.C. 154(b) by 0 days.

(21) Appl. No.: 17/849,454

(22) Filed: Jun. 24, 2022

(65) Prior Publication Data
US 2022/0335237 A1 Oct. 20, 2022

Related U.S. Application Data

(63) Continuation of application No. 17/128,624, filed on Dec. 21, 2020, now Pat. No. 11,397,865, which is a continuation of application No. 15/813,692, filed on Nov. 15, 2017, now Pat. No. 10,878,208.

(60) Provisional application No. 62/422,643, filed on Nov. 16, 2016.

(51) Int. Cl.
*G06Q 10/06* (2023.01)
*G06K 7/10* (2006.01)
*G06K 7/14* (2006.01)
*G06Q 10/00* (2023.01)
*G06Q 10/02* (2012.01)

(52) U.S. Cl.
CPC ....... *G06K 7/10722* (2013.01); *G06K 7/1413* (2013.01); *G06K 7/1417* (2013.01); *G06Q 10/00* (2013.01); *G06Q 10/02* (2013.01); *G06Q 10/06* (2013.01)

(58) Field of Classification Search
CPC .............................. G06Q 10/06; Y04S 10/54
USPC ........................................... 235/382; 705/51
See application file for complete search history.

(56) References Cited

U.S. PATENT DOCUMENTS

2016/0164958 A1* 6/2016 Sharan ................ H04L 63/0876
709/217

* cited by examiner

*Primary Examiner* — Toan C Ly

(57) ABSTRACT

The present invention provides the method for users to access different content when users snap a picture of a single Optical Code. The present invention relates to a method and system that provides a single user or concurrently provides multiple users with controlled access to custom and interactive content. The present invention stores a Unique Key within the Optical Code used to look up programmed instructions. The present invention uses the snap of the camera on the portable computer and imaging device to initialize the programmed instructions associated with the Unique Key. The System provides a method by which a set of actions can be performed with the simple snap of the Optical Code using a portable computer and imaging device.

20 Claims, 17 Drawing Sheets

Controlled Access Overview Diagram

Exemplary Cereal Box Use Case

Exemplary Code Category

Greeting Card Code Category
(Exemplary Actions)

| Action | ActionType | Requirement | Inputs | Outputs |
|---|---|---|---|---|
| 1. Get more data needed from the device | COLLECT DATA FROM DEVICE | Get phone number, email address, and user name from device | N/A | Phone Number, Email Address, User Name |
| 2. Store CARD SENDER information as a unique record for future use | EXECUTABLE FUNCTION | Store sender's phone number and the Unique Key of the scanned Optical Code in the Greeting Card Code Category Datastore | Sender's Phone Number, Unique Key | Success or Failure status of storage attempt |
| 3. Display "SEND NEW CARD" UI with customized User Name | CUSTOMIZE CONTENT | Display Publisher's Customized Content to User with their own personalized User Name | User Name and Phone Number of CARD SENDER | Welcome [USER NAME], please add your own personalized message and upload a photo or video to send.<br>Name of Receiver: <br>Phone Number of Receiver: <br>Message: <br>Photos or videos: add more [SEND] |

*Fig. 15A*

Greeting Card Code Category
(Exemplary Actions)

| Action | ActionType | Requirement | Inputs | Outputs |
|---|---|---|---|---|
| 4. Store CARD RECEIVER information as a unique record for future use | EXECUTABLE FUNCTION | Store information received from the CARD SENDER into the Greeting Card Code Category database forming uniquely identifiable recorder so that only the designated CARD RECEIVER will have access | Unique Key, CARD RECEIVER's Phone Number, Name, Message from Sender, added Photos or Videos | Success or Failure status of storage attempt |
| 5. Display "RECEIVE CARD" UI with customized content from Sender | CUSTOMIZE CONTENT | Show the CARD RECEIVER the customized content sent to them by the CARD SENDER | Unique Key, CARD SENDER's Phone Number, User Name and CARD RECEIVER's Phone Number, and Name | [RECEIVER NAME], you have received a personalized card from [CARD SENDER NAME]! Message: <br><br> View photos or videos: <br> Reply Message: <br><br> SEND    CLOSE |

*Fig. 15B*

Greeting Card Code Category
(Exemplary Actions)

| Action | ActionType | Requirement | Inputs | Outputs |
|---|---|---|---|---|
| 6. Store CARD RECEIVER's Reply message | EXECUTABLE FUNCTION | Store Reply information received from CARD RECEIVER so that CARD SENDER will be able to view it within the system | CARD SENDER's Phone Number, CARD RECEIVER's Number, Reply Message | Success or Failure status of storage attempt |
| 7. Display "SEND TO ANOTHER" UI to CARD SENDER | CUSTOMIZE CONTENT | If the CARD SENDER has already sent the card to a CARD RECEIVER, allow them to send another personalized message to another CARD RECIEVER | CARD SENDER's Phone Number | [USER NAME], would you like to Send another personalized message for this greeting card? [YES] [NO] |

*Fig. 15C*

METHOD AND SYSTEM THAT PROVIDES ACCESS TO CUSTOM AND INTERACTIVE CONTENT FROM AN OPTICAL CODE

CROSS-REFERENCE TO RELATED APPLICATIONS

This application is a continuation application that claims the benefit of U.S. application Ser. No. 17/128,624 filed Dec. 21, 2020, which claims the benefit of U.S. application Ser. No. 15/813,692 filed Nov. 15, 2017, which claims priority from: "METHOD AND SYSTEM THAT PROVIDES ACCESS TO CUSTOM AND INTERACTIVE CONTENT FROM AN OPTICAL CODE", U.S. Provisional Application No. 62/422,643, filed Nov. 16, 2016, the contents of which are incorporated herein by reference in its entirety.

FIELD OF THE INVENTION

The present invention relates to a method and system that provides a single user or concurrently provides multiple users with controlled access to custom and interactive content when using a portable computer and imaging device to scan an optical code published by the System.

BACKGROUND OF THE INVENTION

A barcode is a machine-readable optical label that contains information about the item to which it is attached. A QR code uses four standardized encoding modes to efficiently store data. A QR code consists of black squares arranged in a square grid on a white background, which can be read by an imaging device such as a camera, and processed using Reed-Solomon error correction until the image can be appropriately interpreted. The required data are then extracted from patterns that are present in both horizontal and vertical components of the image. Currently, when individuals snap a single QR Code using a Mobile Device, at the time the snap occur, the same information is provided to all individuals who snap the single QR Code.

SUMMARY OF THE INVENTION

The present invention when individuals snap a single optical code (e.g., QR Code) using a Mobile Device, at the time the snap occur, customized or different information can be provided to all individuals who snap the single Optical Code.

The present invention includes a method and system to provide a single user or concurrently provide multiple users controlled access to custom and interactive content when users of a portable computer and imaging device scan a "single" Optical Code.

The present invention provides the method for users to access different content when users snap a picture of a single Optical Code. The System provides a single user or concurrently provides multiple users the ability to access different messages, information, instructions, software applications or programmed functions from the snap of a single Optical Code using a portable computer and imaging device.

The present invention is uniquely designed to use an Optical Code to store a reference address (Unique Key) to programmed instructions. The present invention stores a Unique Key within the Optical Code used to look up programmed instructions. The present invention uses the snap of the camera on the portable computer and imaging device to initialize the programmed instructions associated with the Unique Key. The program instructions store the programs, commands, and rules to provide the same or different programmable functions, features or information to users. Rules are established within the programmed instructions to define the criteria for selecting users for certain programmable functions. The programmed instructions are triggered by a portable computer and imaging device (e.g., a Mobile Device like a smart phone) upon a user snapping a picture of an Optical Code. When the user snaps a picture of the Optical Code, the System's algorithm is programmed to decode the Optical Code and retrieve the Unique Key to the programmed instructions within the Optical Code. Once the programmed instructions are located, the Application Server is programmed to automatically execute the program instructions in accordance with the programmed commands stored within the programmed instructions. The present invention executes the programmed instructions simply upon a user snapping a picture of the Optical Code with a portable computer and imaging device. The System provides a method by which a set of actions can be performed with the simple snap of the Optical Code using a portable computer and imaging device. For example, when a user snaps an Optical Code, the System provides the ability for users to immediately have access to information, menu selections, software applications and commands that grant access or deny access to things like electronic documents, appliances or secured facilities, as well as, programs to unlock or lock doors, buy and pay for products and services. The present invention provides methods for Publisher's or third party's software, mechanical and electrical devices to be integrated with the Application Server to provide controlled access to customized content. An example of an integration of the Application Server to provide customized content is the use of a vending machine where users upon a snap of an Optical Code can have Controlled Access to the vending machine to make selections and purchase products via the System. The System is capable of executing a set of actions (a command or series of commands) with a single scan using a portable computer and imaging device. The present invention utilizes various data sources, including GPS data to establish Controlled Access and Customized Content for each user. The present invention utilizes a unique method to facilitate the process required to provide a single user or concurrently provide multiple users Controlled Access to custom and interactive content when users of a portable computer and imaging device scan a "single" optical code.

Within the programmable instructions is the means to recognize the user based on identifying information like cell phone number and name. Upon the snap of an Optical Code, users' information is captured from the portable computer and imaging device for example, cell phone number and current location. Additional user information is captured from the user's account profile. The Application Server matches and authenticates data to authorize a release of information or perform a programmed function. Rules are established within the programmed instructions to define the criteria for selecting users for certain programmable functions. For example, an Optical Code can be generated by the System and placed on a teacher or professor's desk, door, classroom wall or any place where the Optical Code can be clearly viewed. The teacher or professor has the ability, as the Publisher, to enter the student cell phone numbers, which is then saved into a database server. The System is programmed to create a record for each student using the cell phone number as the student's unique identifier along with other information like the student's name. The teacher or professor can enter the student grades within each student record. The students download the System app and register to use the System. Once the students are registered, the students are able to scan the System Optical Code published by the teacher or professor (the Publisher). Once the student snaps a picture of the published Optical Code using their Mobile Device, the System reads and recognizes the Unique Key to find the programmed instructions, which tells the System to get the cell phone number from the Mobile Device to identify the student. The System continues to follow the instructions and commands programmed in the programmed instructions. In this example, the programmed instructions provide instructions that compares the user's (student) cell phone along with the user's (student) profile information against the teacher or professor's (publisher) file that contains the student records in order to authorize access. Once the student record is found and is matched using the student's cell phone number and name, captured from the student's Mobile Device and the System's saved user profile information, the System releases the test score and grade data to the student authorized to receive the student record information. The data is displayed on the authorized student's Mobile Device, e.g., smart phone.

The programmed instructions are programmable to find the student's cell phone number, name and other information to identify the student. Once authentication occurs, the System authorizes the Mobile Device to provide the grades and test scores stored in the student record to only the student authorized based on the authentication process. In this example using students, the present invention's unique method allows a teacher or professor to generate a single Optical Code from the System, in which all students can snap the single Optical Code to get their grades, test scores and any other pertinent information stored in the student file.

In a different example, the present invention may provide a homeowner or renter the ability to use a single Optical Code posted on the homeowner or renter's front door to facilitate a phone call, text, conversation, video live streaming, or GPS location system when another individual outside of the front door snaps the Optical Code posted on the front door with a Mobile Device. The present invention provides the method and system to determine and retrieve data or content from the publisher and third party software applications, mechanical or electrical devices in order to facilitate software, telephonic, mechanical or electrical function when a user of a Mobile Device snaps a single Optical Code.

The present invention may allow franchises, such as Chick-fil-A and McDonalds, to provide customized and interactive content that is accessible by their customers or targeted audiences from a single Optical Code. The present invention provides the method and system so that an unlimited number of users can be concurrently provided unique, customized and interactive content when users snap a single Optical Code with a Mobile Device. A unique Optical Code could be placed on a table or any location. Upon a user snapping a picture of the Optical Code using a Mobile Device, like a smart phone, the restaurant food menu will display in a different language based on the user's data, the table location could immediately be identified based on the specific Unique Key found in the table's Optical Code, and the information is programmable to be communicated to the restaurant's employees for instant bi-directional communication and to be associated with the user's food order. The present invention provides, for example, franchisers like Chick-fil-A and McDonalds the ability to place a single Optical Code on a sandwich wrap or bag to provide users with unique, customized and interactive content along with Controlled Access to information, software and other programmable functions when a user of a Mobile Device snaps the single Optical Code. The System allows multiple users upon the snap of a single Optical Code with a Mobile Device, such as a smart phone, to access Customized Content (e.g., a food offerings, coupons, commercials, music, games or any programmable functions) based on various data such as the user's data, user's metadata, device's data and device's metadata to customize the content. Businesses can place the System-generated Optical Codes on any physical object such as, tables, cups, sandwich bags, large signs in the parking lot or etc. The business may also supply its own Optical Code, generated outside of the System, and the System will use the decoded value of the business-supplied Optical Code as the Unique Key for future usage.

In a different example, the present invention has the capability to provide Controlled Access to customized and interactive content based in specific locations. The present invention has the methods and systems to utilize a single Optical Code that has been posted on a wall, table or any article at the specific location to control the access of Customized Content. The present invention provides the method to give users accessibility to customize content based on GPS location and proximity to a specific location. Customized content at a specific waiting room location could include access to magazine articles, music, videos, live streaming and movies that are specific to a location. The present invention gives users, who are within the distance parameters set by the System, access to the content when users snap an Optical Code with a Mobile Device. Customized Content can also include Controlled Access to information, software and other programmable functions. The present invention would allow clients and visitors sitting or standing in a waiting area access to customized and interactive content when the user, within the distance parameters set by the System, snaps an Optical Code with a Mobile Device. The present invention further controls access based on real time computing of distances using GPS location of the waiting area to the user. The present invention has the ability that once a user departs the waiting area, the content provided can be programmed to terminate within a designated time period. The present invention allows for customizing of the content based on multiple factors including age, gender, preference, time, date, location, and etc. The present invention allows a specific location, e.g., doctor office, to offer an audience with customized and interactive content within the specific location when the users snap a single Optical Code with a Mobile Device.

The present invention may allow users who meet a certain set of criteria including location within a specific distance based on real-time GPS data, team preference, and other requirements can snap the same Optical Code and be added to a specific group discussion. The group communication can be in the form of micro blogging with other users who are supporting the same team at stadium location during the game.

The System has the ability to execute various commands and provide customized content from a single Optical Code. The System derives its unique ability from the Invention's method that provides a single user or concurrently provides multiple users Controlled Access to custom and interactive content when users of a portable computer and imaging device to scan a "single" Optical Code published by the system or imported in to the System.

BRIEF DESCRIPTION OF THE DRAWING

FIG. 15A depicts the Greeting Card Code Category exemplary actions 1, 2 and 3 with action type, requirements, inputs, and outputs.

FIG. 15B depicts the Greeting Card Code Category exemplary actions 4 and 5 with action type, requirements, inputs, and outputs.

FIG. 15C depicts the Greeting Card Code Category exemplary actions 6 and 7 with action type, requirements, inputs, and outputs.

DETAILED DESCRIPTION OF THE INVENTION

Figure 1:
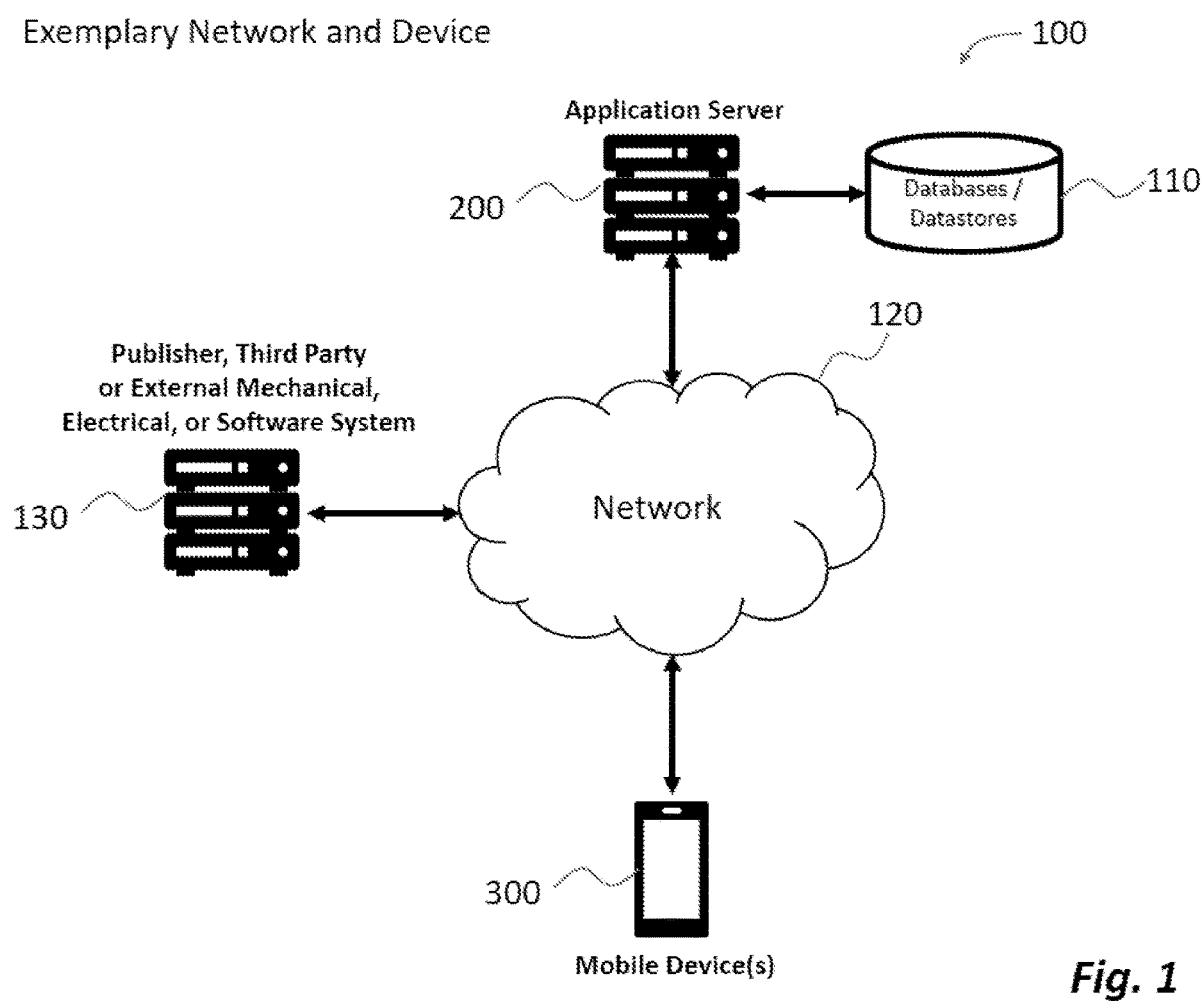
FIG. 1 depicts an exemplary network with relevant devices used by the System.

The present invention provides a method and system that provides a single user or concurrently provides multiple users with Controlled Access to custom and interactive content when using a Mobile Device to snap a "single" Optical Code. The present invention provides a method for using an Optical Code that when it is scanned or a picture of the Optical Code has been taken by an imaging device like a smart phone, the system provides a single user or concurrently provide multiple users with Controlled Access to content based upon data received and retrieved from various sources including criteria and programmable commands established by a single or multiple party entities (e.g., the content provider, user or a 3rd party entity) required to facilitate the Controlled Access.

The present invention provides a "Code Category" where the type or class of communication and interaction definition can be associated with a specific Optical Code. For example, a specific Optical Code might have a Code Category for interactive video. Each Code Category has a required set of Actions and each Action has a "Communication Contract" outlining the specific data requirements needed to leverage the features required by the Code Category's Action. The Communication Contract provides the specific data requirements needed to leverage the features required by the Code Category's Action. A Communication Contract could include GPS location data, facial detection or recognition data, video streaming, audio streaming, application data, custom sockets, or any other interface available on the mobile device.

The present invention concurrently provides multiple users the ability to snap a single optical code (Decoded Value, e.g., "P100") with a Mobile Device to view and interact with Custom Content. Subsequently, allowing each user via a single Optical Code (Decoded Value, e.g., "P100") the ability to add Custom Content and provide Controlled Access (e.g., for public, private or selected users access) to the content added. The present invention provides the method to allow unlimited number of users to concurrently view, interact, add content and provide Control Access to other users via a single Optical Code (Decoded Value, e.g., "P100"). The present invention allows a single Optical Code (Decoded Value, e.g., "P100") to be posted where an unlimited number of users could use a Mobile Device to snap a picture of a single Optical Code (decoded value, e.g., "P100") for a group's interactions.

The Controlled Access is provided by facilitating the authorization process that includes the matching of a) the Unique Key (i.e., the Optical Code's Decoded Value) associated to a Code Category within the System with b) the Publisher's unique identifier that is assigned by the System when the Publisher assigns user(s) authorization to the Custom Content associated with the Unique Key with c) information of or related to a user (e.g., age, social security number, etc.), a mobile device (e.g., phone number, GPS location, etc.), or other Publisher-selected constraints (e.g., time of day, a sports team's final score, etc.) to authorize access to the Publisher's Customized Content associated with the Unique Key.

The data received and retrieved from various sources, as well as, criteria and programmable commands established by a single or multiple party entities (e.g., the Publisher, a content provider, user or a $3^{rd}$ party entity) used to facilitate Controlled Access and the Custom Content can be provide from sources such as: Device data or metadata that is contained within the device or data about the device such as its location, time, date, available resources, device settings, and etc; Data entered or previous stored by user; User profile settings; User preferences; User payment information; User interaction data; Data about the user such as purchasing history, number of devices registered and etc.; User access codes; Captured or live data such as digital photo of an individual, physical object or landscape; Publisher data or metadata that is specific to a publisher, as their name, unique identifier, security codes (passwords), preferences, or data about the publisher's data, such as number of users interacting with content, number of recently scanned optical codes, etc.; Code Category that provides the type or class of communication and interaction definition required for the specific optical code wherein each Code Category has one or more Actions with each Action having a Communication Contract outlining the specific data requirements needed to leverage the features required by the Code Category; An Action's Communication Contract which provides the specific data requirements needed for the features of the Action, ultimately used within a specific Code Category wherein a Communication Contract could include GPS location data, facial detection or recognition data, video streaming, audio streaming, application data, custom sockets, or any other interface available on the mobile device; Executable programs; Images; Dynamic or static web content (web pages, flash files, etc.); Dynamic or static mobile content (responsive mobile web content, mobile applications, etc.); Videos; Sounds; Surveys; Micro blogging or Chatting; Other constraints such as time of day or a stock's closing price; and Other created content.

The following terminology is used throughout the specification and claims:

1. "Mobile Device" is a portable computer and imaging device, such as a smart phone, smart watch, optical head-mounted display/digital camera, standard digital camera, laptop, other wearable, other portable computing device, and any combination of these types of devices.
2. "Content" is executable function (program or file), instructions, images, dynamic or static web content (e.g., web pages, flash files, etc.), dynamic or static mobile content (e.g., responsive mobile web content, mobile applications, etc.), videos, sounds, surveys, or other custom created content that is executable by a user or system (such as a computer), viewable to a user, or has the ability to be interacted with by a user or system (such as a computer). Content can be hosted in any location, a system local to the Application Server or an external system (hosted by the publisher or a third party).
3. "Custom Content" (also referred to as Customized Content) is customized instances of Content, which can be supplied by Publishers, Users, third-party system or entity, or any entity capable of integrating with the system and creating content.
4. "Optical Code" is defined as a unique 1, 2, or 3-dimensional machine scannable code, such as a bar code or QR code. When scanned and decoded, the resultant value is the Unique Key.
5. "Capture" is digital photo or any other physical scanning method.
6. "Device Data or Metadata" is defined as data contained within the device or data about the device, such as its location, available resources, device settings, etc.
7. "User Data or Metadata" is defined as data entered or previous stored by the user, such as profile settings, preferences, payment information, interaction data, or data about the user such as purchasing history, number of devices registered, etc.
8. "Code Category" is the type or class of communication and interaction definition required for the specific Optical Code. Each Code Category is a subroutine having a set of Actions and each Action will have both an ActionType and a Communication Contract outlining the specific data requirements needed to leverage the features required by the Code Category. For example, a specific optical code might have a Code Category for interactive video.
9. "Publisher Data or Metadata" is defined as data specific to a publisher, such as their name, unique identifier, security codes (passwords), preferences, or data about the publisher's data, such as number of users interacting with content, number of recently scanned optical codes, etc.
10. "Decoded Value" is the resultant data from decoding an Optical Code. It will be the value of the Unique Key, and may be text, numerical, alphanumerical, binary, or any other resultant data type.
11. "Communication Contract" is the definition of the specific data requirements needed for the features used within a specific Code Category Action. This contract may include required data inputs and outputs, GPS data, video streaming, audio streaming, application data, custom sockets, or any other data or interface available on the mobile device, and also includes data sent to and retrieved from custom content, external systems, or executable functions.
12. "Action" (see ActionType) is a process step defined within a Code Category. An Action is also referred to as a Code Category's process step. An Action may have various process steps, which are classified by types referred to as an "ActionType". Each Action will have a Communication Contract denoting the data requirements for the process step.
13. "Unique Key" is a value generated from the System that will uniquely identify a specific Code Category's custom configuration. It will be encoded into an Optical Code (see Optical Code) and used to associate a Code Category's custom configuration to the Optical Code. The Publisher distributes the Optical Code with their asset, such as media, a system, a digital asset or physical object (a printed card, a dining room table, or a vending machine) thereby making the association with the Unique Key and configured Code Category. A Unique Key may also be derived from an Optical Code generated outside of the System where the non-System generated Optical Code's decoded value (the resultant data of decoding the optical code) becomes a Unique Key used by the System.
14. "Controlled Access" is the method of combining an Optical Code's Unique Key with identifiable data for a Sender and/or Receiver so that content access may be governed or content may be customized based on the Sender or Receiver's associated data. Associated identifiable data may include data related to a Sender or Receiver's unique identity (such as phone number), preferences (such as preferred hobbies), device data (such as GPS location or device type), demographic data (such as age), or other data which can be used to identify, classify, or target the Sender or Receiver with relevant content.
15. "Sender" is an individual or entity initiating the distribution of content to a Receiver or group of Receivers using an Optical Code. The Sender works within the context of content created by a Publisher to send content to Receivers. For example, a user may snap an Optical Code using a Mobile Device and based on rules within the Code Category and Publisher's Customized Content for that Optical Code, the user who performed the snap may be given the opportunity to create their own content, such as a text message, and send it to someone. In this case, the user has become a Sender of content. The individual(s) who the Sender sends content to the Receiver. The Sender also sets the parameters used by Controlled Access to determine distribution of content to Receiver(s), for example, a person's phone number might be used to ensure that only they receive the content sent by the Sender.
  a. "CARD SENDER" is referenced in FIG. 8 as a type of Sender in the context of the custom Greeting Card Code Category. The concept of a Sender may be applied and adapted to any specific scenario, such as Greeting Cards, stationary, social media, or others, each having extended the concept of Sender to meet their specific requirements.
16. "Receiver" is the individual(s) or entity that is receiving content from a Sender using the same Optical Code. If Controlled Access rules permit, the Receiver will receive the content sent to them by the Sender using the same Optical Code the Sender used to create the content.
a. "CARD RECEIVER" is referenced in FIG. 8 as a type of Receiver in the context of the custom Greeting Card Code Category. The concept of a Receiver may be applied and adapted to any specific scenario, such as Greeting Cards, stationary, social media, or others, each having extended the concept of Receiver to meet their specific requirements
17. "ActionType(s)" is the kind or classification of Action used within a Code Category and is the means by which an Action's types of characteristics and requirements are determined. There are four ActionTypes in this present invention and they are detailed below:
  a. ActionType: "COLLECT DATA FROM DEVICE" is the type of Action that is used to collect data from the Mobile Device, such as a GPS location, user information, or other information contained on the Mobile Device.
  b. ActionType: "CUSTOMIZE CONTENT" is the type of Action that is used to govern access, via Controlled Access, and to alter or customize content based on specific criteria and data available. Content may be customized with this type of Action using data collected from the Mobile Device (device data or metadata), collected about the User (user data or metadata), or any other type of data available to the System through integrations or user interactions.
  c. ActionType: "INTERFACE WITH EXTERNAL SYSTEM" is the type of Action where an external system, such as a web service or API call, is used to fulfill the requirements of an Action.
  d. ActionType: "EXECUTABLE FUNCTION" is the type of Action where any executable program, file, function, library, service, instruction(s), or command(s) may be initiated, sent data, and receives data. This could be a call to things like a database or a local script or a installed library used to perform an action.
18. "Configured Code Category" is a Code Category that has been configured with specific customizations, such as Customized Content or external system endpoint locations.
19. "Snap" is the process of scanning or taking a picture of an Optical Code with a Mobile Device.
20. "External System" is a system outside of or external to the Application Server such as a Publisher's server, a Third Party system, or a data store. The External System may include a web service call, an HTTP get or post, an API call, an object storage location, an stream, a file exchange, or any other type of access method used to facilitate interaction and integration between the System, the User, and the External System.
21. "Executable Function" is any executable program, file, function, library, service, instruction(s), or command(s) that may be initiated, sent data, and receives data. Examples include a call to a database, a local script, or a library, such as a DLL, used to perform an action or get data.
22. "Endpoint" is an External System access location or address with which the System can communicate. Examples include an IP address and port number, URI, URN, and URL.

Figure 14:
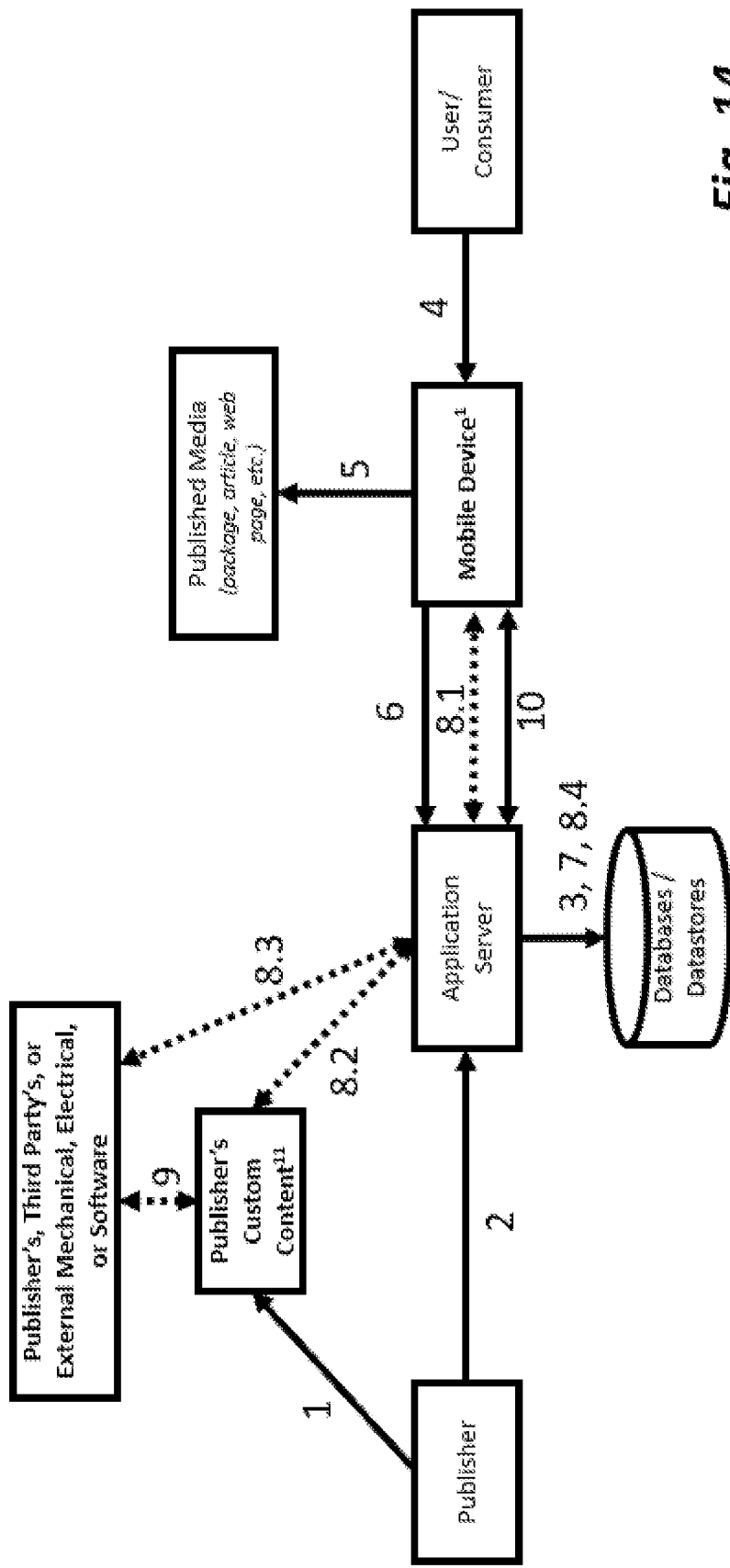
FIG. 14 depicts a high-level overview of the System's communication follow between primary components.

Referring to FIG. 14, is a high-level diagram of the entire system's usage. Each number (n) in this paragraph correlates to the communication flow number in the FIG. 14. Prerequisite to this sequence is the creation of a Code Category as outlined in [500] FIG. 5. (1) The Publisher creates or modifies their custom content and/or configures external system endpoints as defined by selected code category. (2) Publisher creates and/or saves Unique Key(s) and Optical Code(s) which are sent to the Application Server. (3) The Application Server stores information in datastore including Publisher information, unique key(s), Optical code(s), custom configuration data (content and endpoints), and associates with the Code Category. Note: Items 1, 2, and 3 are explained in greater detail in FIG. 4, Note: At this point in the sequence, the Optical Codes may be placed on any media of physical object the Publisher desires. (4) A user of a mobile device initiates a scan or capture of an Optical Code on some form of media or physical object (e.g. a website, article, physical sticker, vending machine, etc.). The Optical Code was one of the Optical Codes created in item 2 above. (5) Upon capture of the Optical Code, the Mobile Device decodes the Optical Code into Unique Key. (6) The Mobile Device sends the Unique Key (aka the "Decoded Value"), device information/data, and user information/data to the Application Server. Note: FIG. 6 is a detailed explanation of the process starting from this point, that is, at the point the Application Server receives the information from item 6 above. (7) The Application Server retrieves information from databases/datastores based on the data sent from the Mobile Device and determines the Code Category and Publisher's customized set of Actions. (8) Based on the Code Category's Action set, the Publisher's customizations, business logic, device data, device metadata, user data or user metadata, the Application Server may request additional data from Mobile Device, interact with Publisher's content for customization purposes, interact with External Systems (including anything external to Application Server such as Publisher, Third Party systems, or databases/datastores), or may invoke Executable Functions. These are reflected in 8.1, 8.2, 8.3, and 8.4. (9) The Publisher's content may optionally require communication with External Systems, such as a vending machine or software component. If so, this is the point at which the content interacts with mechanical, electrical, or software components directly. (10) The Application Server establishes a continuous (until terminated) bidirectional communication channel (based on the Code Category's Action set) with the Mobile Device in order to complete the desired outcome of the Publisher.

FIG. 1 outlines that the system is comprised of an Application Server(s) [200], Databases and Datastores [110], a communications Network [120], External Mechanical, Electrical, or Software Systems [130], and Mobile Devices [300]. External systems referenced in [130] may include those which are from the Publisher, which are from Third-Party entities, or are any system hosted outside of the Application Server.

Figure 2:
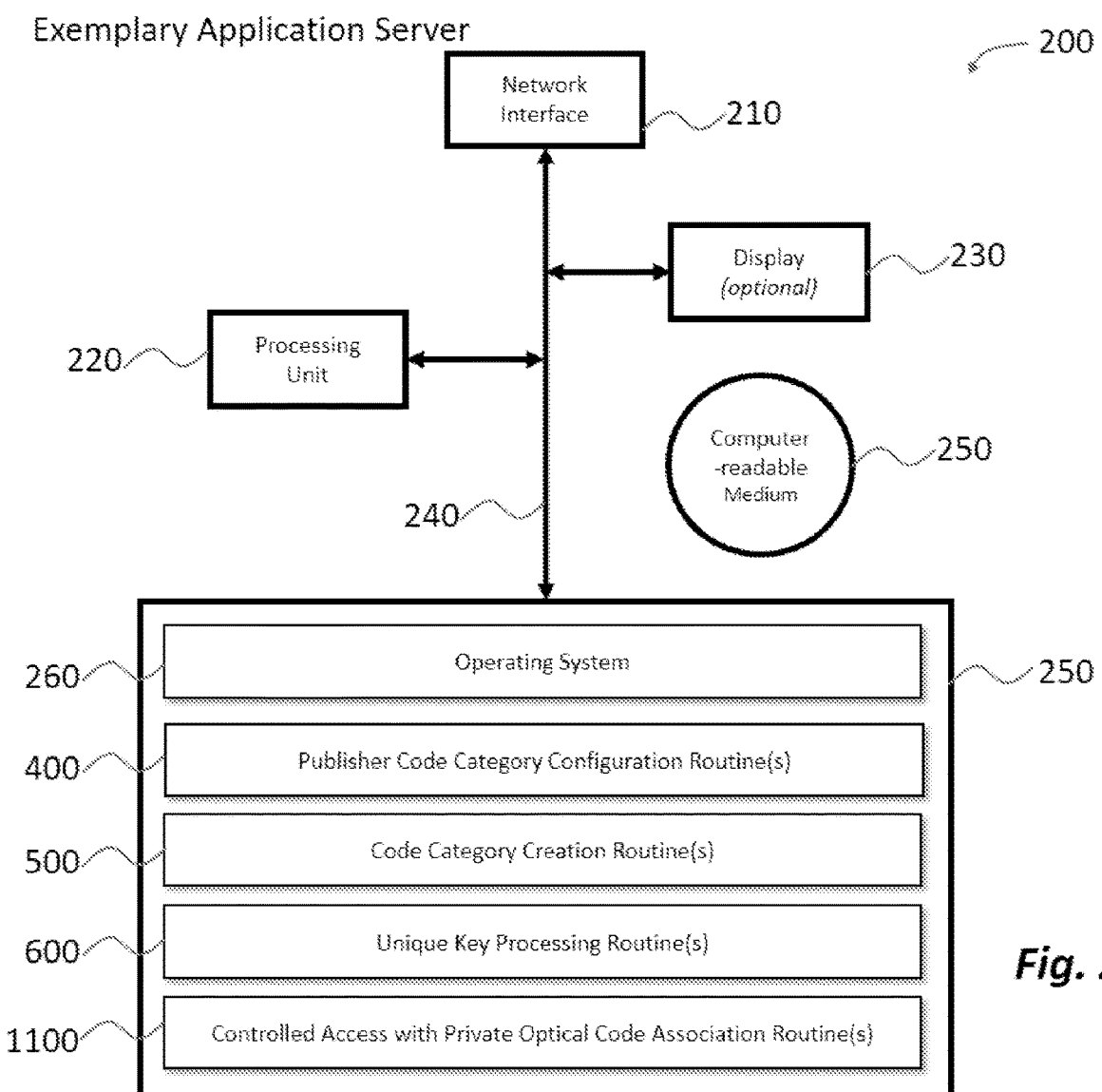
FIG. 2 depicts an exemplary Application Server with its primary components.

FIG. 2 diagrams the Application Server [200], which is the primary system performing functions required to fulfill the functionality of the patentable invention. The Application Server brings together the functional programs, rules, data sources, and external systems as will be later described. The Application Server is comprised of a Network Interface(s) [210], Processing Unit(s) [220], optional Display(s) [230], and Computer Readable-Medium(s) [250] including but not limited to internal and external storage. Functionality of the Application Server is expressed in [250] and includes the Operating System [260], Publisher Code Category Configuration Routine(s) [400], Code Category Creation Routine(s) [500], Unique Key Processing Routines(s) [600], and Controlled Access with Private Optical Code Association Routine(s) [1100].

Figure 3:
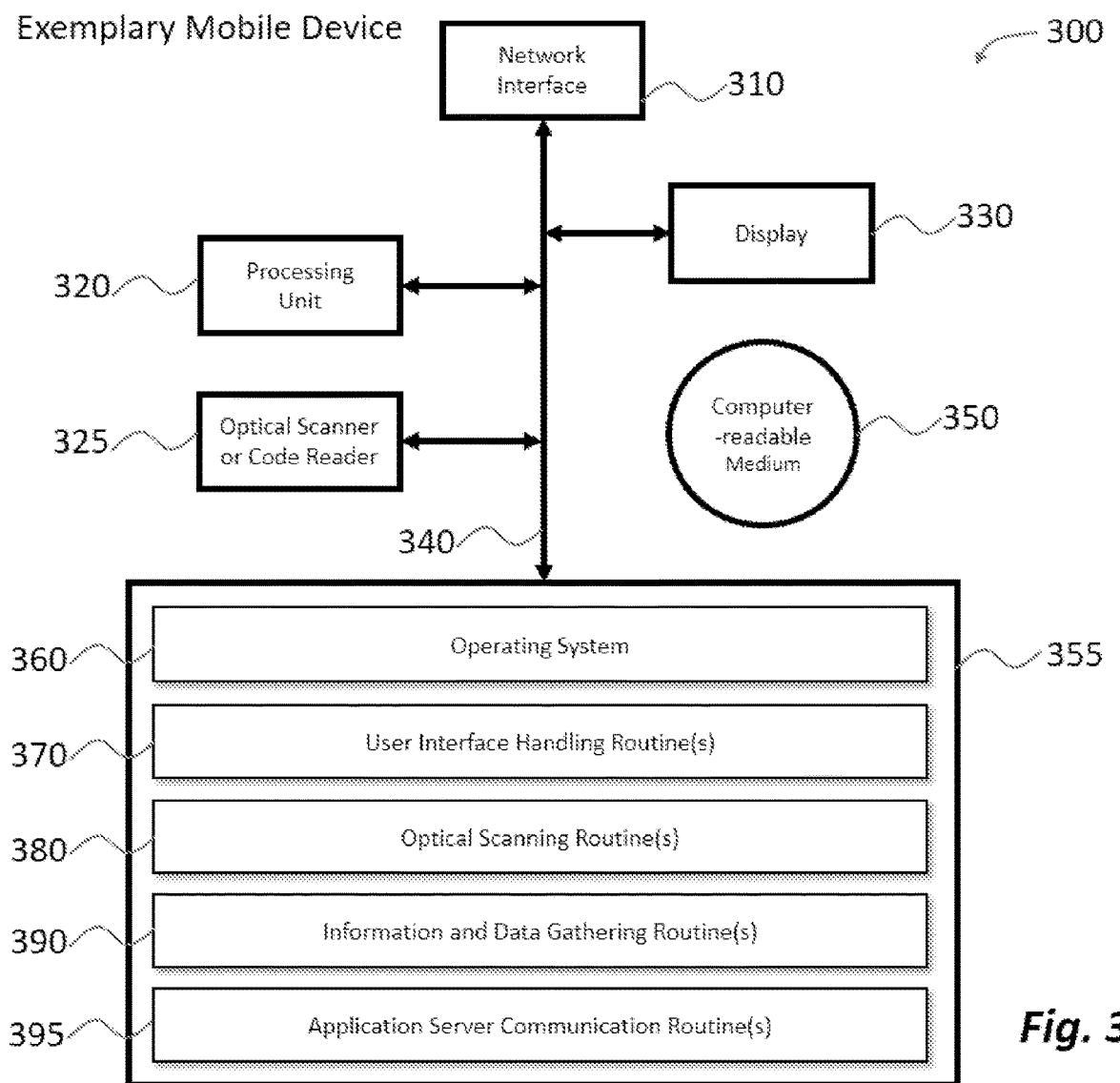
FIG. 3 depicts an exemplary Mobile Device with its primary components.

FIG. 3 diagrams the Mobile Device, which is any portable computing device capable of scanning optical codes, interacting with a user, storing data locally, and communicating over a network. This may include mobile phones (e.g., SmartPhones, tablets, laptops, or any other portable device capable of the same. The Mobile Device is comprised of a Network Interface(s) [310], a Process Unit(s) [320], Optical Scanner(s) or Code Reader(s) [325], Display(s) [330], and Computer Readable-Medium(s) [350]. It also includes functionality reflected in [355] which is comprised of an Operating System(s) [360], User Interface Handling Routine(s) [370], Optical Scanning Routine(s) [380], Information and Data Gather Routine(s) [390], and Application Server Communication Routine(s) [395]. User Interface Handling Routine(s) [370] are the various routines which will be primarily responsible for interacting with the user interface, which may include HTML, Javascript, or any other mobile device user interface language or technology. Optical Scanning Routine(s) [380] may include routines that operate a mobile device's camera and converts optical codes into their decoded value, which could be textual, numeric, alphanumeric, binary, or any other data type. Information and Data Gather Routine(s) [390] are routines primarily occupied with collecting and processing data from the mobile device, user, or other systems with which the mobile device interacts, including connected BlueTooth devices, Internet-based services, or any other system with which the mobile device may be interacting or to which it is integrated. Application Server Communication Routine(s) [395] are routines primarily responsible for interacting with the system's Application Server [200], including the sending and receiving of data, content, and instructions.

Figure 4:
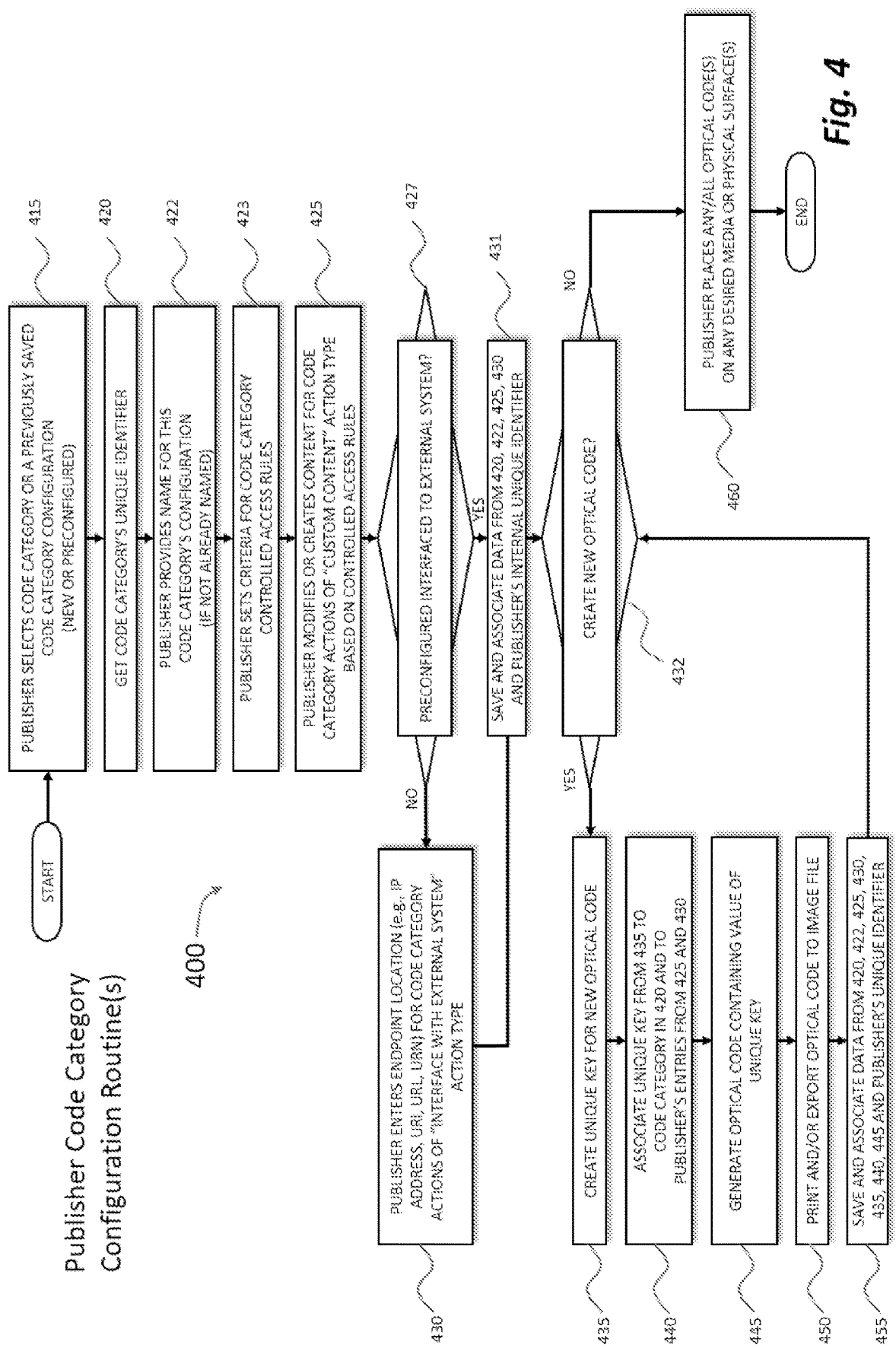
FIG. 4 depicts the Publisher Code Category Configuration Routine(s) which allows a Publisher to configure a Code Category with their own Customized Content, Controlled Access rules/criteria, and system integration endpoints.

FIG. 4 diagrams the Publisher Code Category Configuration Routine(s) [400], which is primarily responsible for allowing the publisher to select and configure Code Categories. This configuration includes the creation of customized content as well as information on how the Publisher can have the system interact with their own External systems. To start, in step [415] the Publisher identifies which one of the available Code Categories they would like to configure and create optical codes. The system gets the unique key of the selected Code Category in [420] for use later in the process. In step [422] the Publisher provides a name so that the configuration they are about to create will be retrievable later for review, modification, or replication. If the Code Category is associated with Actions of the "CUSTOMIZE CONTENT" ActionType (outlined in FIG. 5), then for each Action of this kind, the Publisher sets Controlled Access criteria in [423] allowing them to govern access to "CUSTOMIZED CONTENT", and the Publisher modifies or creates Customized Content in step [425] allowing them to create a unique content experience for future users interacting with their specific Optical Codes. The Controlled Access criteria supplied in [423] is based on the Controlled Access rules defined with the Code Category. Controlled Access rules may be based on device data or metadata, user data or metadata, user input data, or any other data from an available data source. For example, a Code Category may define that current GPS location of the Mobile Device is a Controlled Access rule. The Publisher in step [423] may indicate specific GPS locations as Controlled Access rule criteria and then they supply specific Customized Content per GPS location in [425]. More on Controlled Access can be found in FIGS. 9, 10, and 11 as well as their detailed explanations. It is possible that Code Categories may be pre-configured for the Publisher, specifically with regard to communication with their external systems, and in step [427], the system determines if this Code Category was already configured. If the Code Category was not preconfigured, then in step [430], the Publisher provides details for any Action associated with the Code Category of the "INTERFACE WITH EXTERNAL SYSTEM" ActionType. In step [431] the system saves and associates all information received for future reference along with the Publisher's unique identifier. In step [432] the Publisher is now ready to create an Optical Code(s). A Unique Key is created in step [435] which will later be converted to an Optical Code. In step [440], the Unique Key which was created in [435] is associated the Code Category from step [420] and the items previously saved in [425] and [430]. An Optical Code is created in [445] and given a human-readable name, such as "Dining room table number 5", and the Publisher is given the opportunity to print or export the Optical Code in [450]. The data from [420], [422], [425], [430], [435], [440], [445] and the Publisher's unique identifier are saved for future reference. Once completed with creating Optical Codes, the Publisher is able to use the created codes on any form of media or physical object in [460] so that users may scan them in the future.

Figure 5:
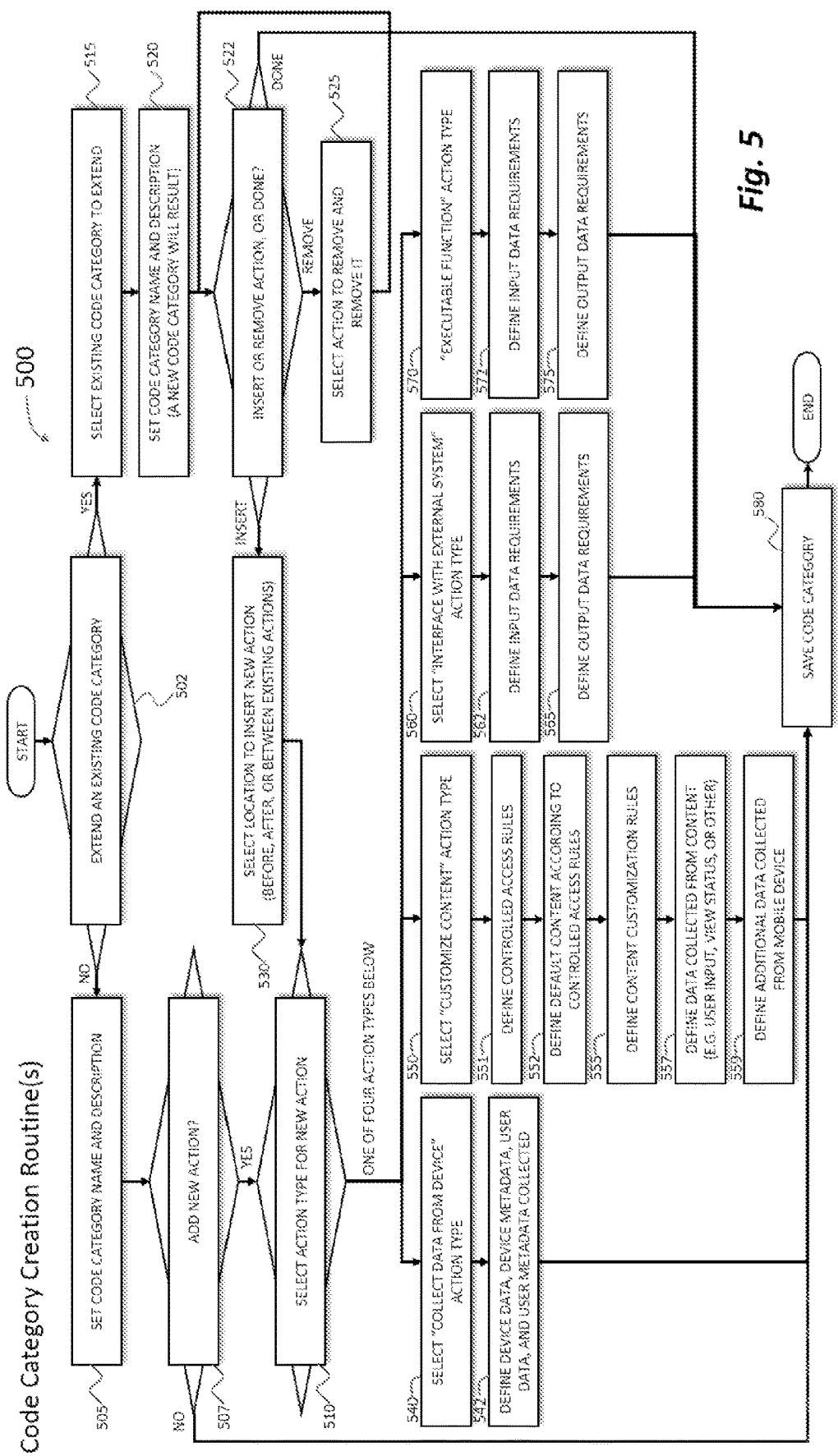
FIG. 5 depicts the Code Category Creation Routine(s) which is the process and method by which Code Categories are created and made available to Publisher's for configuration.
Figure 6:
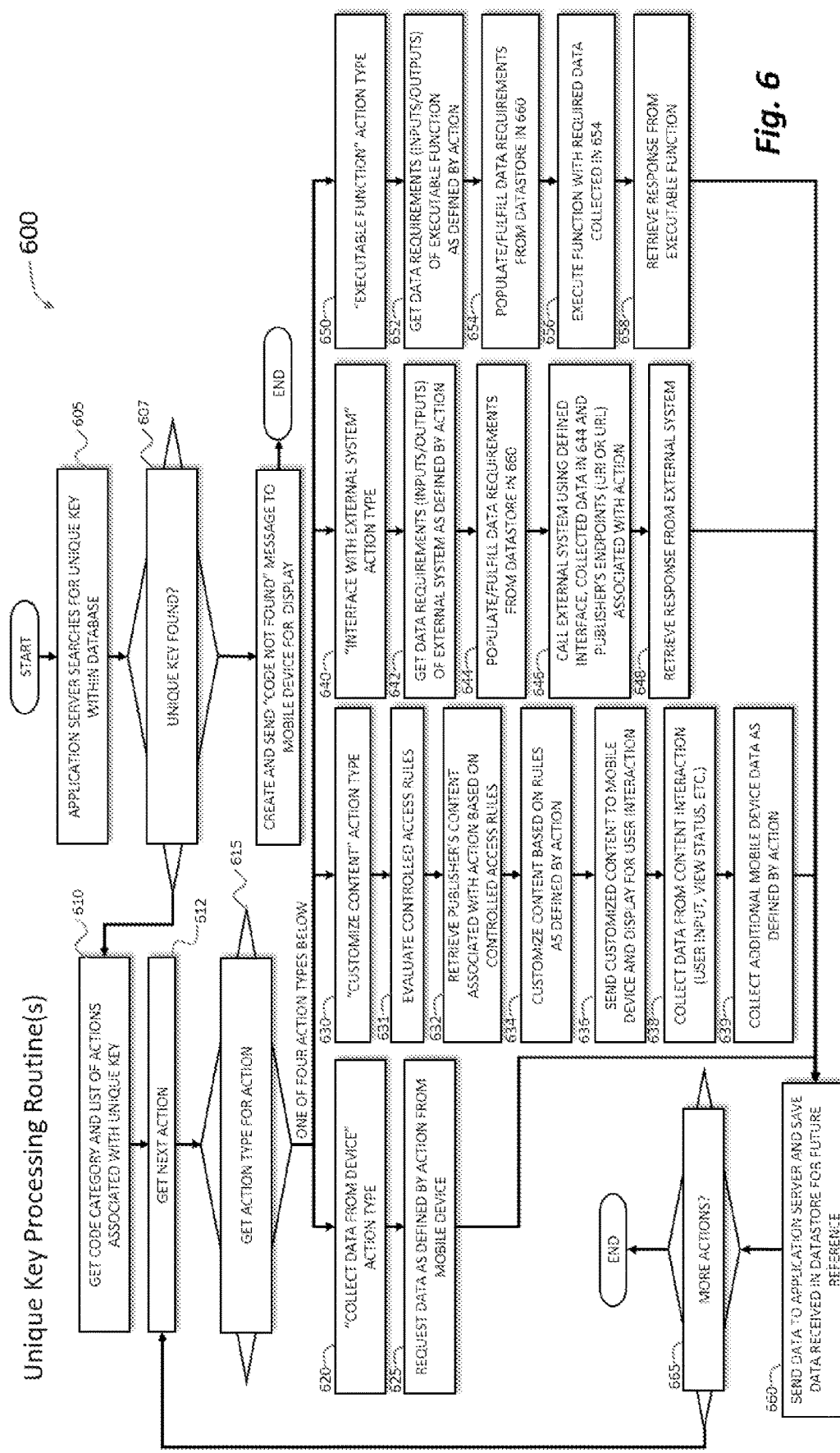
FIG. 6 depicts the Unique Key Processing Routine(s) which is the process and method by which an Optical Code's Unique Key enables a customized process and interaction experience.

FIG. 5 diagrams Code Category Creation Routine(s) [500], outlines the process by which Code Categories are created and extended. Code Categories are defined in the Terms section of this document, they outline a set of Actions and are the means by which specific Optical Codes are associated with Publisher-specific content and systems. In [502] we give the option to either create a new Code Category or to extend or modify an existing one. If a Code Category is already in place and only needs some additional modification, then it will save time to extend that Code Category so as not to repeat previous definition. For new Code Categories, in [505] a name and description are given to the Code Category for later reference. In [507] Actions may be added to the new Code Category based on the desired goal of the specific Code Category being created. [510] is where the type of Action is selected, which can be one of four types. Step [515] is the path taken from [502] if an existing Code Category is to be extended or modified, and in [515] the Code Category to extend will be selected. In [520] the new resultant Code Category will receive a name and description. Given that Actions will already exist within the Code Category because an existing Code Category was used as the starting point, step [522] is where an Action may be inserted, removed, or where the process of adding Actions will be finished. If an Action is to be removed, this will occur in [525] and the process will then go back to [522] to give the option of inserting, removing, or finishing the Action modification step. If an Action is to be inserted from [522], then in [530] the location of where to insert the Action is selected. The location in [530] is relative to existing Actions, and if there are no existing Action then it will be inserted as the only Action. Once the location is determined, then [510] follows where, as described above, is where one of four ActionTypes are selected. ActionTypes are each outlined in [540], [550], [560], and [570]. If ActionType "COLLECT DATA FROM DEVICE" is selected, then in step [540] was chosen and we move to step [542] where the type of data to collect from the mobile device is defined. [542] may include device data, such as the operating system type of the mobile device, device metadata such as the number of applications installed on the mobile device, user data such as the user's name, or user metadata such as the number of phone numbers the user has defined. If in [510] the "CUSTOMIZE CONTENT" ActionType was selected, then in [550] the [551] step is performed in which Controlled Access rules are defined and then in [552] default content is provided based on the Controlled Access rules for the Action. The default content might be a greeting user interface with a message, which will later be customized once the Code Category is complete and is used by a Publisher in [425] from FIG. 4, detailed above. In [555] specific customization rules may be introduced, such as allowing the default message to include a variable such as the user's name. In this case, a standard message may be presented which will contain the user's name when rendered in [634], which is outlined in FIG. 6. In [557], additional items may be outlined which are required to be retrieved from the user as they interact with the content provided in this Action. For example, the default content may include input text boxes for the user to supply information. For [559], additional data may need to be retrieved from the mobile device for use in subsequent Actions, such as the GPS location of the mobile device, and these data items are defined in this step. If in [510] the "INTERFACE WITH EXTERNAL SYSTEM" ActionType was selected, then in [560] the process moves to [562] where the input data requirements are outlined for the external system. For example, if a web service is to be called as part of this Action, then the input requirements of the web service are outlined so that this Action may communicate with the web service. In [565] the output requirements of the external system are defined so that as the Action communicates with the external system, data received from the external system is captured and available for use in later Actions. In [570], if "EXECUTABLE FUNCTION" was selected in [510], then step [572] is where the inputs are outlined needed to invoke the executable functions. Executable functions may include programs, scripts, services, libraries or any other mechanism not already covered whereby logic and algorithms may be performed. In [575], the outputs from executable function are outlined so that the data received may be captured for use in future Actions. In [580], the Code Category and all of its configuration are saved into the catalog of Code Categories for future reference and usage.

FIG. 6 diagrams Unique Key Processing Routine(s) 600, which begins after an Optical Code has been scanned by the user with their mobile device, decoded, and sent to the Application Server. The decoded value of the optical code is the Unique Key created by the Publisher in [435] outlined in FIG. 4. In [605] the Application Server searches for the Unique Key previously created in [435]. If not found in [607] the process ends, or if the Unique Key is found in [607], the Publisher's configured Code Category associated with the Unique Key and the customized list of Actions associated with the Unique Key are retrieved in [610]. In [612] a loop is started going through all Actions associated with the Unique Key. The ActionType of the current Action in [615] will be one of four ActionTypes, leading to [620], [630], [640], or [650]. If the ActionType in [615] is "COLLECT DATA FROM DEVICE" then [620] leads to [625] where the data previously defined in [542] in FIG. 5 is collected from the mobile device. If the ActionType in [615] is "CUSTOMIZE CONTENT" then [630] leads to step [631] where Controlled Access rules are evaluated governing authorization to the Publisher's Customized Content. In [632] the Publishers content (created in [425] of FIG. 4) is retrieved based on the Controlled Access rules. In [634] the content customization rules are applied, such as the insertion of the user's name into the content as defined in [555] of FIG. 5. In [636], the customized content is sent to the mobile device and displayed to the user for interaction. In [638], the information collected from the user's interaction with the customized content is collected by the mobile device. In [639], any additional data required as defined in [559] of FIG. 5 is collected from the mobile device. If the ActionType in [615] is "INTERFACE WITH EXTERNAL SYSTEM" then [640] leads to [642] where the data requirements for the inputs and outputs of the external system are collected, as defined in steps [562] and [565] of FIG. 5. In [644], data available to the system, including the data previously collected from previous Actions, or data associated with the user registration and/or preferences, may be used to populate the input data required to interact with the external system. In [646] the external system is called according to the defined data communications contract using the data populated in [644]. The external system responds in [648] according to the communications contract and the data received is collected and stored within the output fields defined in [565] of FIG. 5. If the ActionType in [615] is "EXECUTABLE FUNCTION" then [650] leads to [652] where the data requirements for calling the executable function are retrieved as defined in [572] and [575] of FIG. 5. In [654] data available to the system, including the data previously collected from previous Actions, or data associated with the user registration and/or preferences, may be used to populate the input data required to interact with the executable function. In [656] the executable function is invoked using the data collected and outlined in the communications contract, with the response data received and stored in [658] as defined in [575] of FIG. 5. In [660], all data collected from each Action of any ActionType is sent to the Application Server and saved by the Application Server in appropriate data stores for future reference. If there are additional Actions to process, then [665] will lead back to [612] where the next Action is retrieved.

Figure 7:
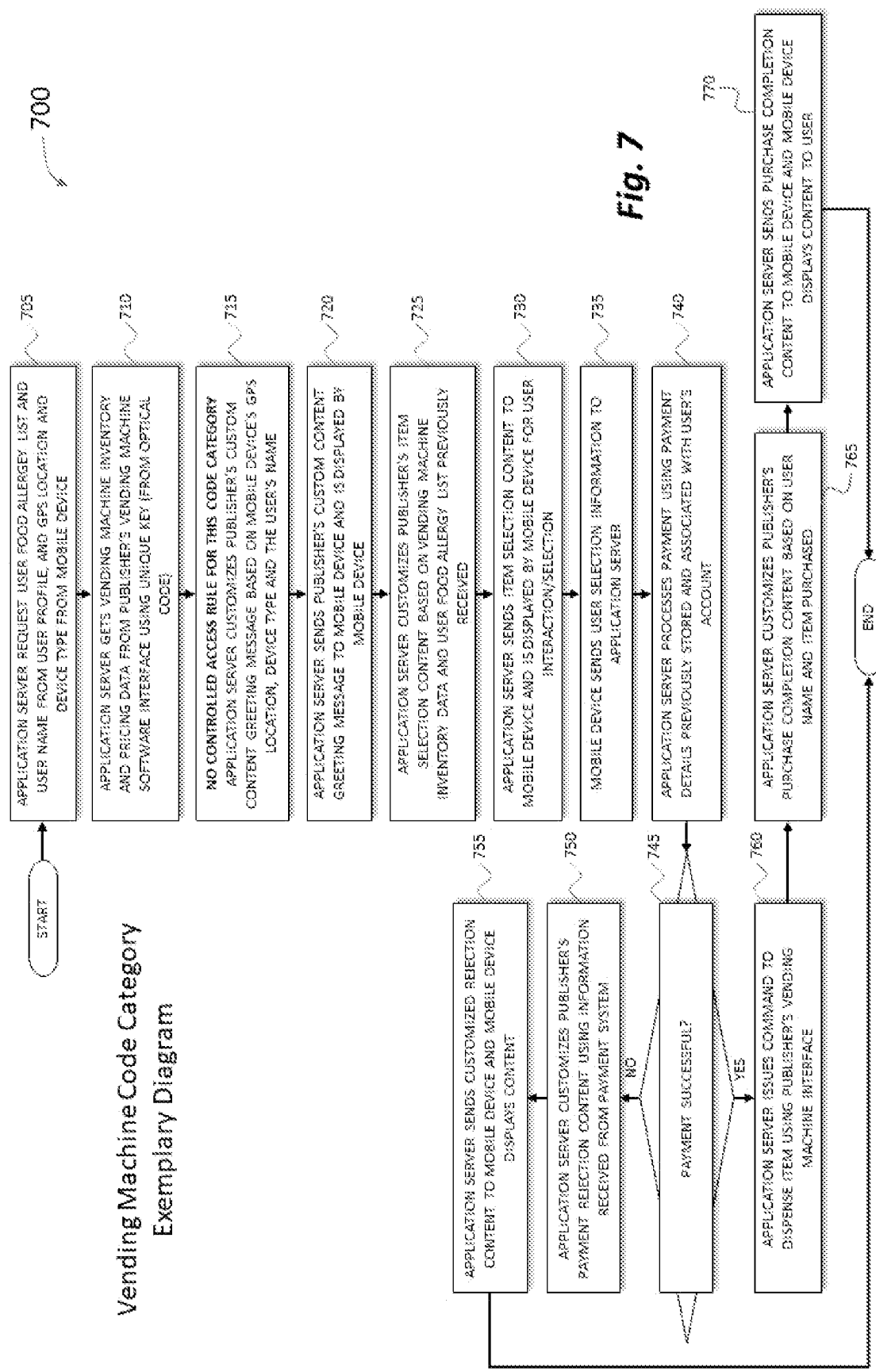
FIG. 7 depicts an exemplary process flow for the present invention's application to a Vending Machine whereby a Publisher can allow a User to interact with and purchase from a vending machine with a customized experience on their Mobile Device.

FIG. 7 diagrams a Vending Machine Code Category (700) example. The present invention provides the ability for a company who distributes goods via vending machines to leverage the System to sell items to customers. Customers will simply scan the Optical Code located on the vending machine with their Mobile Device. Immediately following the scanning of the Optical Code, they will be presented on their Mobile Device with a customized and personalized menu of options and pricing details available within the vending machine. Upon selection of an item to purchase, the System will perform a payment transaction using the user's previously stored payment information and the vending machine will dispense the item selected. A prerequisite of being able to transact in this way, the company will simply configure the Code Category available within the System which is designated for "vending machine" types of transactions. During this configuration process, the company will have the opportunity to add customized content for the menu which will be presented to the customer and to customize the endpoint locations of where the System will communicate with Vending machines. The system will communicate with the company's vending machine in order to retrieve available menu items as well as to tell the vending machine to dispense the selected item upon successful payment. Prerequisite to the Publisher being able to configure their own customized scenario, a Code Category must be created for a generic vending machine scenario. The detailed outline of how Code Categories are created is contained within FIG. 5. In this case, a new Code Category will be created and in [505] it will be called "Vending Machine" and its description will be "A generic transaction outline between a mobile device and a vending machine". In this example, the "Vending Machine" Code Category would include the following eight Actions:

TABLE 1

| Action | ActionType | Requirement | Inputs | Outputs |
|---|---|---|---|---|
| 1. Get more data needed from the device | COLLECT DATA FROM DEVICE | Get GPS Location, Device Type, and User Name from Mobile Device and User's Profile | N/A | GPS Location, Device Type, and User Name |
| 2. Get the inventory and pricing details from the vending machine | INTERFACE WITH EXTERNAL SYSTEM | Communicate with vending machine (or proxy system) using the endpoint, such as a URL or URI, to get inventory and prices. | Unique Key (the decoded value of the Optical Code) | A list of items available within the vending machine and their prices |
| 3. Display a greeting message to the customer | CUSTOMIZE CONTENT | A standard greeting message is displayed to the user customized with their name. | User Name | "Hello [User Name], thanks for shopping with us. We are getting a list of what's included in this vending machine for you, one moment please." |
| 4. Create a menu to present to the customer | CUSTOMIZE CONTENT | A default menu user interface written in HTML is supplied with places where the System will insert available items from the vending machine and their prices. | List of Items and Item Prices | "<p>Here are the items available:</p> <table> <tbody> <tr><td>[Item]</td> <td>[Item Price]</td></tr> </tbody> </table> <p>Click on the item you'd like to purchase and then click below </p> <p><a href="top">Purchase</a></p>" |
| 5. Process payment of selection | INTERFACE WITH EXTERNAL SYSTEM | Perform Payment transaction using endpoint location of payment processing system | Charge amount, payment details | Payment status (success or failure) |
| 6. Reject payment message to customer | CUSTOMIZE CONTENT | Generate a default payment rejection message is supplied. | Charge Amount | "Your payment of [Charge Amount] could not be processed. Have a good day." |
| 7. Dispense vending machine item | INTERFACE WITH EXTERNAL SYSTEM | Communicate with vending machine (or proxy system) using the endpoint, such as a URL or URI, to dispense purchased item. | Item to dispense | Status of dispense request (success or failure) |

TABLE 1-continued

| Action | ActionType | Requirement | Inputs | Outputs |
| --- | --- | --- | --- | --- |
| 8. Purchase complete confirmation message to customer | CUSTOMIZE CONTENT | Display standard message confirming the purchase and thanking the customer. | User Name, Purchased Item | "[User Name], thanks for your purchase of a [Purchased Item], We hope to see you again!" |

With the generic vending machine Code Category in place, the Publisher can select it as an option referenced in step [415] of FIG. 4. The Publisher will then assign "COMPANY X VENDING INTERACTION" as the custom name in [422] for the customized configuration they are about to make for the vending machine Code Category. For the four "CUSTOMIZE CONTENT" Actions within the vending machine Code Category listed in Table 1, the Publisher will use or modify the default content associated with these Actions, or will supply their own content. For the three "INTERFACE WITH EXTERNAL SYSTEM" Actions in the vending machine Code Category, listed in Table 1, they will supply the endpoint locations of where their vending machine can be interacted with over an available network.

Now that the Publisher has customized the content and associated their own endpoints for external systems, the Publisher can create as many Optical Codes as they desire. In this example, the Publisher will create an Optical Code per vending machine. This process is outlined in FIG. 4, steps [432] through [460]. At this point, the Publisher will place Optical Codes on their vending machines and they are ready to start receiving customers through the System.

The customer now approaches a vending machine with an Optical Code in place, scans the Optical Code, and the Mobile Device sends the Unique Key (the decoded value of the Optical Code) to the Application Server. At this point, the Application Server looks up the Unique Key and finds that it is associated with the Publisher's "COMPANY X VENDING INTERACTION" configuration of the "Vending Machine" Code Category. FIG. 7 outlines in detail the process steps that are completed once the Application Server has determined which Publisher's configuration and Code Category is to be used, starting in [705].

Figure 8:
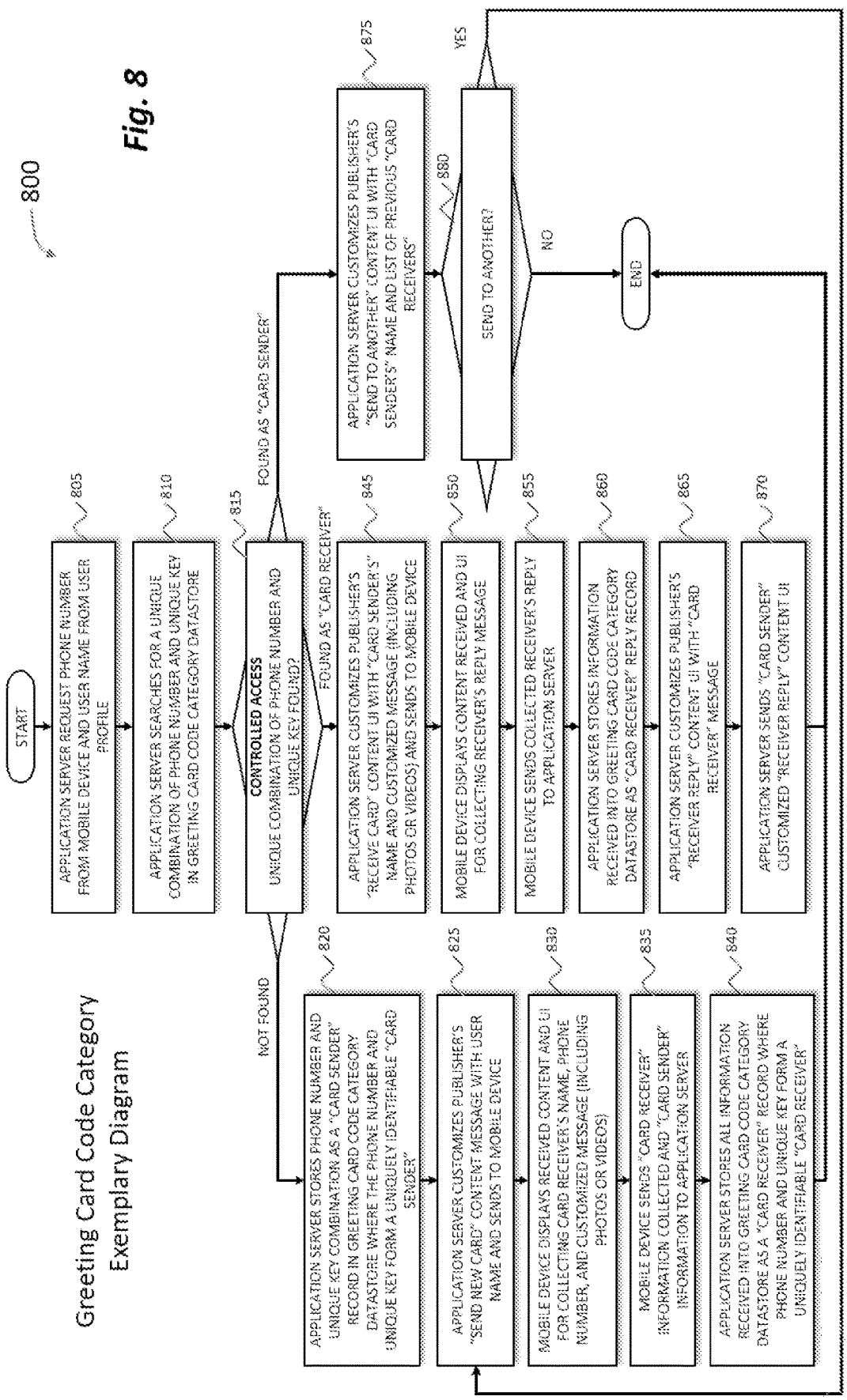
FIG. 8 depicts an exemplary process flow for the present intention's application to a greeting card where by a card purchaser can send personalized content to a card recipient using a single Optical Code and their Mobile Device.

FIG. 8 diagrams how this present invention provides the ability for a greeting card to contain the personal text, pictures, and videos along with personalized and interactive content that can be added and is only accessible by the authorized user with the snap of his or her Mobile Device. The present invention allows publishers, like Hallmark Cards, Inc. or American Greetings Corporation, LLC, to publish a greeting card, with a single optical code, for example "C100"; whereby an unlimited numbers of users, called the Sender, can buy the greeting card ("C100") bearing the same optical code and add personal content to a Receiver, e.g. a loved one or friend. The content is displayed only when the designated authorized Receiver of the greeting card snaps the optical code contained within the greeting card with a Mobile Device. Each Sender, for example the card purchaser, can add their personalized content and authorized recipients, Receivers, of their choice to access their personalized content. The Sender can authorize more than one person as the Receiver. Once the Sender of the greeting card has added both the personalized content and Receiver's information, including the Sender's phone number; then the Receiver of the Personalized and Interactive Greeting Card can snap the Optical Code published within the greeting card with a Mobile Device to access the personalized and interactive content. In this example, the customized and interactive content only displays on the Mobile Device of the Receiver that matches the Receiver's information associated with the Sender's phone number. Any users, who snap the same optical code and are not an authorized recipient (i.e., Receivers), do not have access to the personalized and interactive content of the Sender. The present invention provides the method and system to integrate customized and interactive content within a personal and tangible greeting card. The authorized recipient has controlled access to customized and interactive content and is accessible only to the assigned authorized recipient upon snapping the single optical code published within the greeting card using a Mobile Device. The present invention's system and method can be utilized with other published material including but not limited to stationary, invitations, bulletins, announcements, etc. Prerequisite to being able to create and distribute greeting cards of this type, a Code Category must exist within the system which will represent the generic "Greeting Card" scenario. The detailed outline of how Code Categories are created is contained within FIG. 5. In this case, a new Code Category will be created and in [505] it will be called "Greeting Card" and its description will be "A generic transaction outline between a sender of a greeting card and a receiver of a greeting card". This Code Category will be defined with the seven Actions as shown FIG. 15A, FIG. 15B, and FIG. 15C:

With the generic greeting card Code Category in place, the Publisher can select it as an option referenced in step [415] of FIG. 4. The Publisher will then assign "COMPANY X MOTHER BIRTHDAY CARD" as the custom name in [422] for the customized configuration they are about to make for the greeting card Code Category. For the three "CUSTOMIZE CONTENT" Actions within the greeting card Code Category listed in FIG. 15A, FIG. 15B, and FIG. 15C, the Publisher will use or modify the default content associated with these Actions, or will supply their own content. In this case, their content will be themed for a Mother's Birthday. There are no other Actions in this example which need configuration or customization by the Publisher.

Now that the Publisher has customized the content, the Publisher can create as many Optical Codes as they desire associated with their specific configuration of the Code Category. This process is outlined in FIG. 4, steps [432] through [460]. For this example, they will create one Optical Code for their "Mother's Birthday Card Theme" card and produce 100,000 prints. All 100,000 prints of this card will contain the exact same Optical Code. In this way, the "mother's birthday theme" can be incorporated into the Publisher's Custom Content within the System so that the visual theme of the printed card is also expressed in the Customized Content associated with the Optical Code.

The card purchaser (i.e., the CARD SENDER) now purchases the card, scans the Optical Code it contains, and the Mobile Device sends the Unique Key (the decoded value of the Optical Code) to the Application Server. At this point, the Application Server looks up the Unique Key and finds that it is associated with the Publisher's "COMPANY X MOTHER BIRTHDAY CARD" configuration of the "Greeting Card" Code Category. FIG. 8 outlines in detail the process steps that are completed once the Application Server has determined which Publisher's configuration and Code Category is to be used, starting in [805].

Figure 9:
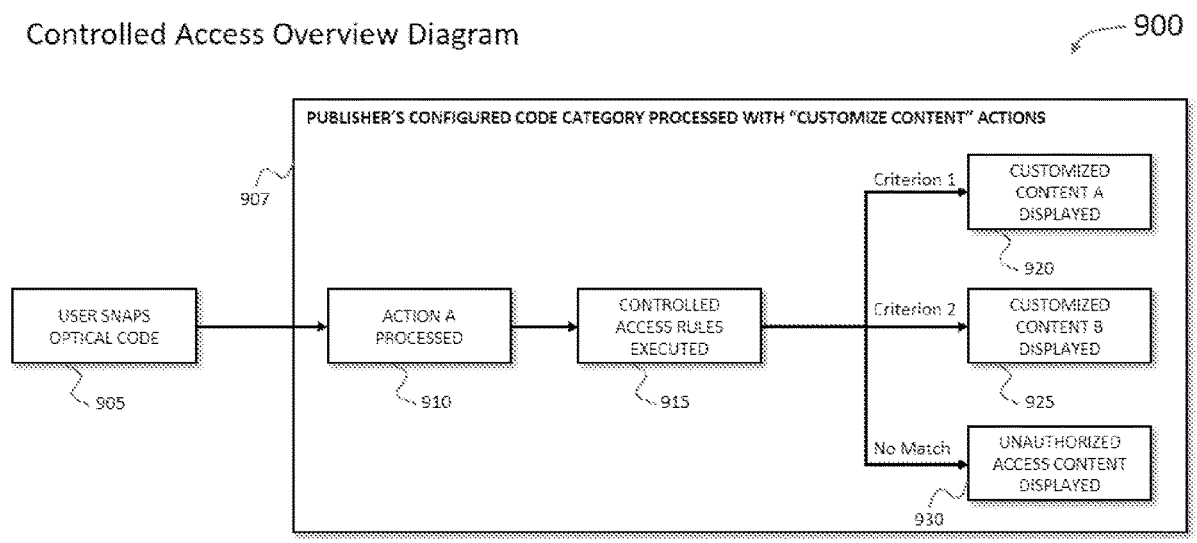
FIG. 9 depicts the method of Controlled Access allowing an Publisher to regulate access and customize a Mobile Device User's experience based on rules and criteria.

FIG. 9 is a diagram showing how access to Controlled Access works at a high-level. A Publisher has created an Optical Code containing the Unique Key associated with their configuration of a Code Category. In [905] a User snaps an Optical Code which then leads to [907], where the Publisher's configured Code Category is processed. The entire method for processing a configured Code Category is outlined in detail in FIG. 6. The Code Category demonstrated in [900] contains an Action [910] where Controlled Access rules in [915] govern permission to view Customized Content in [920] and [925]. Default Controlled Access rules are established in [551] of FIG. 5 as part of the Code Category's definition, and then the Controlled Access rules criteria is established by the Publisher in [423] of FIG. 4. The Publisher supplies Customized Content for Controlled Access rule criteria matches. FIG. 9 shows two Controlled Access rules each having their own Customized Content in [920] and [925]. If the User of a Mobile Device snapping the Optical Code matches the first Controlled Access criterion, then the Publisher's Customized Content A [920] will be displayed to the User, but if the User matches the second Controlled Access criterion, then Customized Content B [925] will be displayed to the User. If the User does not match any of the Controlled Access criteria, then the Unauthorized Access Content [930] will be displayed to the User.

For example, a Publisher creates an Optical Code for a Code Category which displays Customized Content to a User based on their Age. The Code Category is predefined according to [551] that Age is the Controlled Access rule for the specific Action shown in [910], and the Publisher then configures their Code Category according to [423] having two rule criteria. The first criterion is that the age of the User should be 50 or greater to have access to Customized Content A [920]. The second criterion is that Users having an age of 18 to 49 will have access to Customized Content B [925]. This results in Users who are younger than 18 not having access to any Customized Content, but will instead receive the Unauthorized Access Content [930].

In summary, Controlled Access regulates which Customized Content a User can access, if any.

Figure 10:
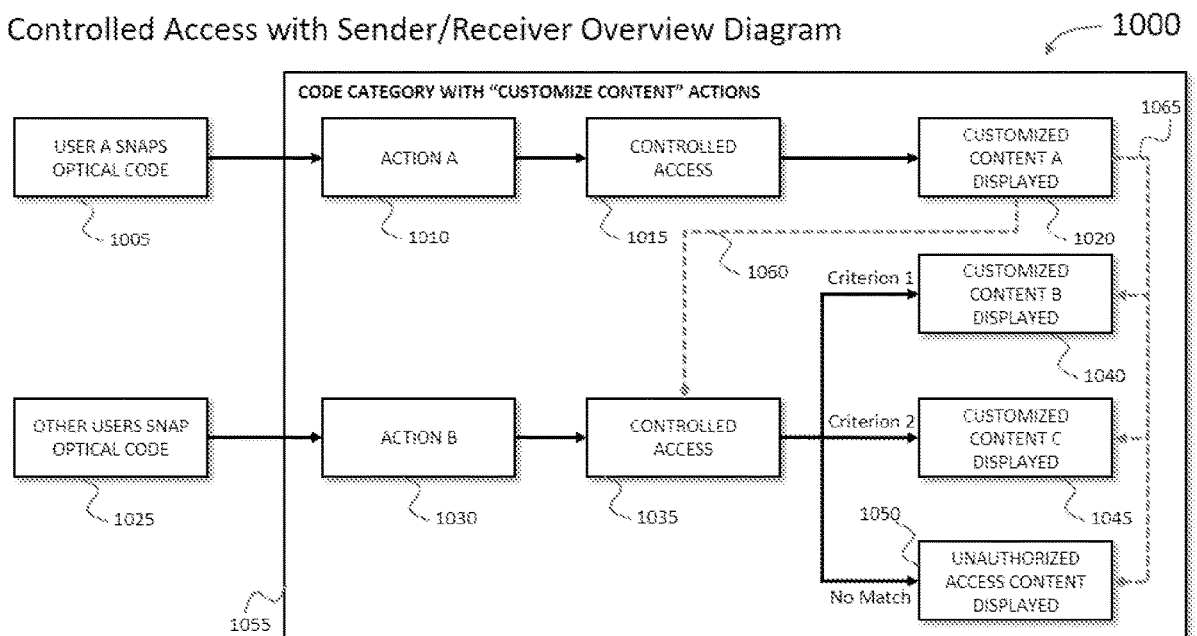
FIG. 10 depicts the method of Controlled Access allowing a Sender to supply their own content in order to augment a Publisher's intended personalized experience for a User or group of Users.

FIG. 10 illustrates how Controlled Access can be extended to include the idea of a Sender (see terms) and Receiver (see terms). Controlled Access rules are initially established by the Code Category and criteria are set by the Publisher based on their specific configuration of the Code Category. But, specific types of Customized Content may allow for Users to extend Controlled Access rules and/or send their own Customized Content, therefore augmenting the Publisher's Customized Content. As in FIG. 9, the above illustrates how Controlled Access regulates which Customized Content a User can access, if any. In [1000], we introduce the concept that a User may influence Controlled Access rule criteria and may augment a Publisher's Customized Content with their own Customized Content. When User A using a Mobile Device snaps an Optical Code in [1005], the Publisher's Code Category Configuration is processed in [1055] and determines they should be presented with Customized Content A [1020] based on Controlled Access rules in [1015]. See FIG. 6 for an entire overview of how Publisher configured Code Categories are processed, though not required to demonstrate the method expressed in FIG. 10. Within Customized Content A [1020], the Publisher has given User A the ability to specify Controlled Access rules [1060] and Customized Content [1065] which will be used by subsequent Users (e.g., "OTHER USERS" in [1025]) who snap the same Optical Code with a Mobile Device and match the Controlled Access rules supplied.

For example, User A purchases two of the same greeting card, one to send to his mother and one to send to his sister. Both greeting cards contain the same Optical Code. When User A snaps the Optical Code from either card [1005], Controlled Access rules [1015] determines that he should be given access to Customized Content A [1020], which is the greeting card Publisher's Customized Content for sending the card to another person. Within Customized Content A [1020], User A is given the ability to supply his own Customized Content for each person he is sending the card to, along with a phone number which will be used to uniquely identify the card recipient. The phone number of the recipients is used to extend the Controlled Access rules [1060], allowing access to his Customized Content for users having the phone number he supplies. The Customized Content he supplies in [1065] for this example includes a text message and a digital photo. When his mother and sister independently receive their cards and snap the Optical Code with a Mobile Device (as "OTHER USERS" in [1025]), Controlled Access rules in [1035] will compare their phone numbers, based on their mobile device, to the phone numbers supplied by User A. If there is a match, each will be taken to the appropriate Customized Content at [1040] or [1045], which consists of the Publisher's original Customized Content now augmented with the User A's Customized Content (the text messages and photos). If a User snaps the Optical Code with a Mobile Device but their phone number does not match those set by User A, they will receive the Unauthorized Access Content in [1050].

This present invention allows for either a Publisher or a Sender to Control Access to Customized Content by determining the criteria a User or group of Users must have in order to qualify for authorization. This is achieved through Controlled Access rules, which match criteria about the User or group of Users to what has been established within a Publisher's configuration of a Code Category or extended by a Sender using a Publisher's Customized Content to supply their own Customized Content. For example, a Publisher may want to regulate Content Access based on the gender of the User. When the Publisher configures their Code Category for their appropriate scenario, they will be allowed to supply Customized Content for each type of gender. This results in the User viewing the appropriate Customized Content upon snap of an Optical Code with a Mobile Device. Likewise, a Sender may also deliver their own Customized Content to a User or Group of Users by leveraging a Publisher's Customized Content. For example, a Publisher may create an Optical Code which is associated with Customized Content that will allow someone to send a video to a User or Group of Users based on their Zip Code. In order to receive the Customized Content, the User or group of Users must match the criteria required. In this example, the criterion is Zip Code 12345. All Users whose primary residence is within a specific Zip Code supplied by the Sender User will receive the Customized Content of the Sender. This is accomplished by associating the Unique Key with a value of "XYZ101" (the decoded value of the Optical Code) with the criterion of Zip Code 12345. Upon snapping the Optical Code with a Mobile Device, the System finds the associated configured Code Category, determines the Controlled Access rules, and compares the Zip Code 12345 against the User who is currently snapping the Optical Code. If their primary residence Zip Code is also 12345, which is stored either in their User profile or on their Mobile Device, then they are allowed to view the Sender's Customized Content. If they do not match the Zip Code, then they will receive an Unauthorized Access Content UI.

Figure 11:
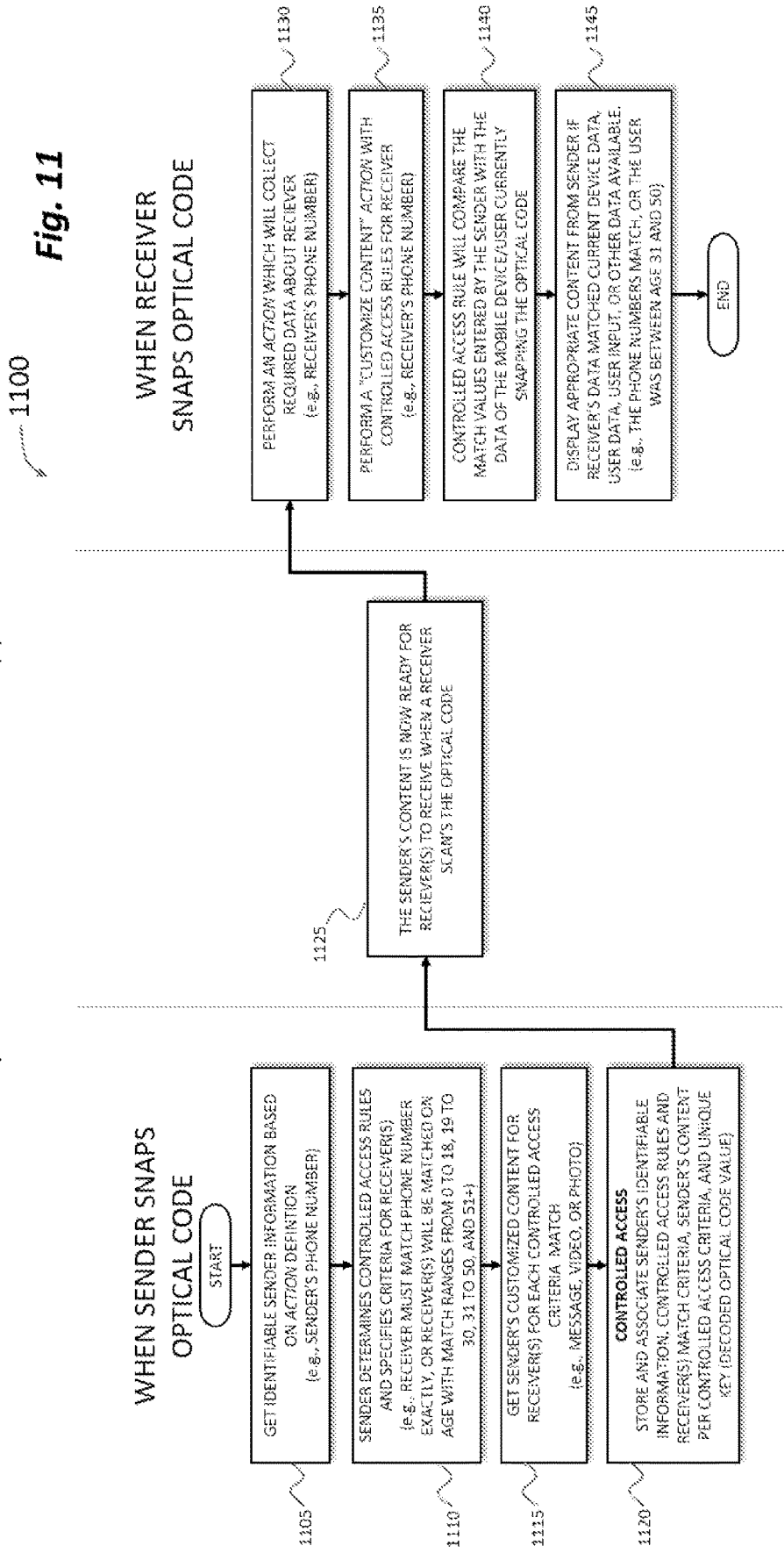
FIG. 11 depicts Controlled Access with Private Optical Code Association Routine(s) which provide a method of Controlled Access where specific rules and criteria are established by a Publisher and augmented by a Sender to regulate access to Customized Content.

FIG. 11 diagrams more around the area of Controlled Access by showing a different view of what happens when a Sender sends something to a Receiver or set of Receivers. Prerequisite to this diagram the Application Server has received the Unique Key resultant from the mobile device decoding a scanned Optical Code and it is found as a validate Unique Key. Also, a Code Category associated with the Unique Key has been created with an ACTION that will request identifiable data for the Sender from user profile, Mobile Device, user input, or other available data source(s). The same Code Category contains an Action of "CUSTOMIZE CONTENT" with Rules defining Controlled Access for a Receiver. Rules are based on Receiver-related data to include but is not limited to one or any combination of: Phone Number, Email Address, Demographic data (such as age or gender), User Preference data (such as favorite color), Device data (such as current GPS location), or any other available data source. In [1105] the System collects information about the Sender, such as their phone number. In [1110] the Sender specifies specific criteria for the Receiver(s) of their Customized Content, such as a Receiver's phone number if to an individual or perhaps an age range (or set of age ranges) if to multiple individuals based on age. In [1115] the Sender supplies their Customized Content per criteria match. So, if sending Customized Content like a set of photos to an individual based on phone number, there will only be one criterion and therefore only one set of photos will be supplied by the Sender. But, if sending to a group of individuals, perhaps based on 3 age ranges, then 3 sets of photos may be supplied, one for each age range. In [1120] the association is made between the Sender, the Sender's criteria, the Receiver(s) (based on the criteria matches), the Sender's Customized Content and the Unique Key of the Optical Code. This allows relevant content to be ready for the appropriate Receiver(s) in [1125].

Figure 12:
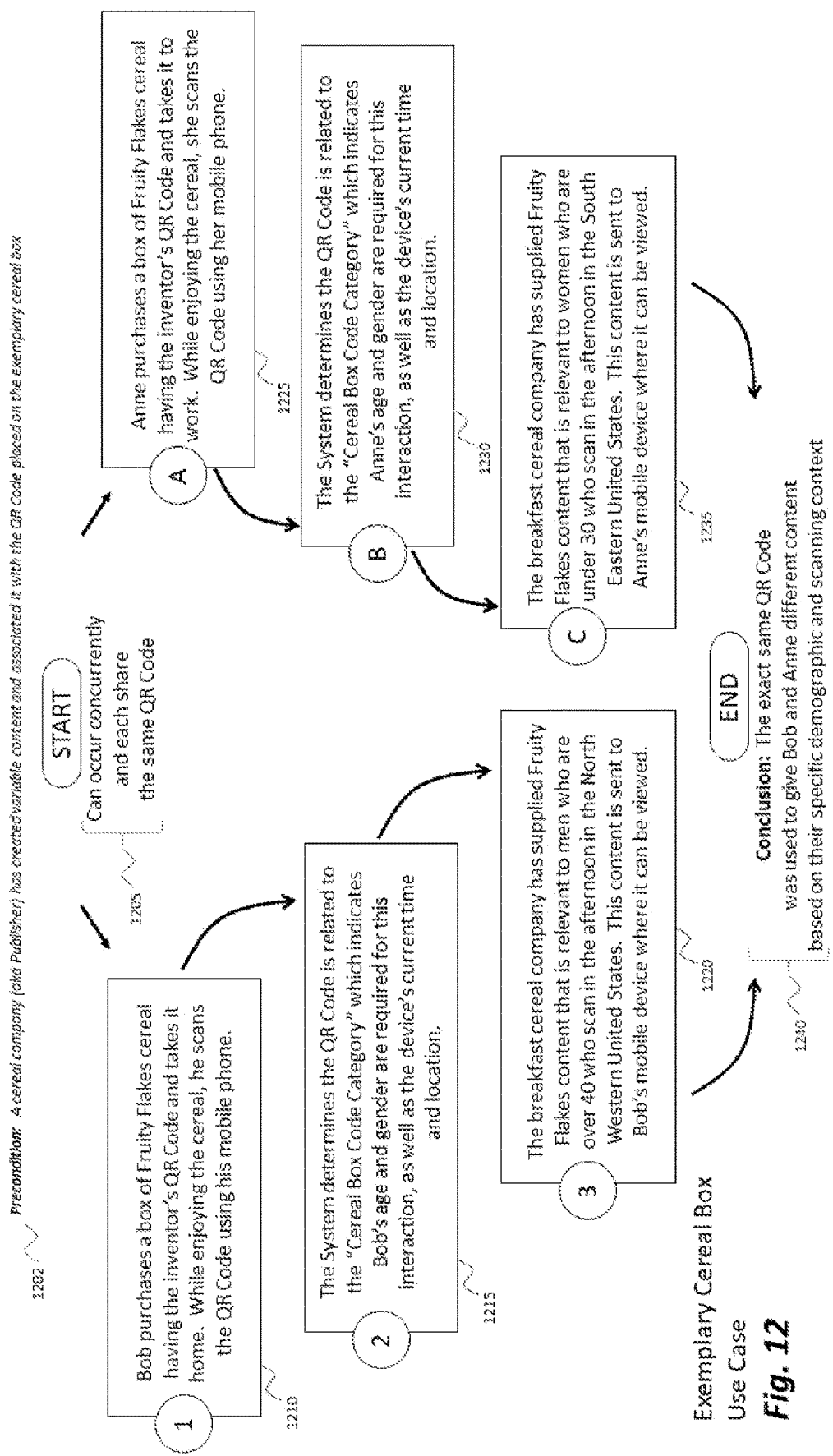
FIG. 12 depicts an exemplary scenario in which multiple consumers use the same QR Code on different boxes of cereal boxes but each consumer having variable interaction experiences based on their own demographic information, computing device data, and other contextual information.

FIG. 12 diagrams an exemplary use case where multiple individuals receive unique experiences by varying content based data comprising individual demographics and the geolocation of the computing device performing the scan. Noted in [1202] as a prerequisite the Start in [1205] a cereal company will create content, making them the content publisher, and they will associate said content with the QR Code placed on multiple cereal boxes. In [1205], the start of the example begins having two scenarios, one with Bob and one with Anne. Bob and Anne represent any number of consumers at any given time who could perform the same or similar steps and interact with the cereal company through the QR Code and the Invention. In [1210] and [1225], each consumer has purchased a box of the same type of cereal, both having the same QR Code, and both consumers concurrently scan the QR code in order to interact with the cereal company. As noted earlier, any number of users can initiate interaction with the cereal company at the same time or at different times. In [1215] and [1230], the Invention searches for the Unique Key contained within the QR Code and matches it to a predefined Code Category. The Code Category defines the Communication Contract required to support a reusable interaction model with cereal boxes. This would allow the same cereal company or a different cereal company to quickly and efficiently supply their own content with the Code Category so that they can quickly produce new QR Codes with interactive experiences. The specific Communication Contract used in [1215] and [1230] specifies that the user's (aka consumer's) age, gender, and the geolocation of the user's computing device are required for this type of interaction. This is the means by which the Cereal Box Code Category (FIG. 13) varies content by the age, gender, and location of the person interacting with the cereal box. In [1220] and [1235] the Invention provides Bob and Anne with content relevant to them based on their age, gender, and geolocation.

This is an improvement over existing technologies where a single QR Code generates the same static experience for all individuals scanning and viewing related content. In the conclusion step at [1240], the point is stated that Bob and Anne have used the same QR Code to receive a unique and dynamic interaction experience from the same QR Code.

Figure 13:
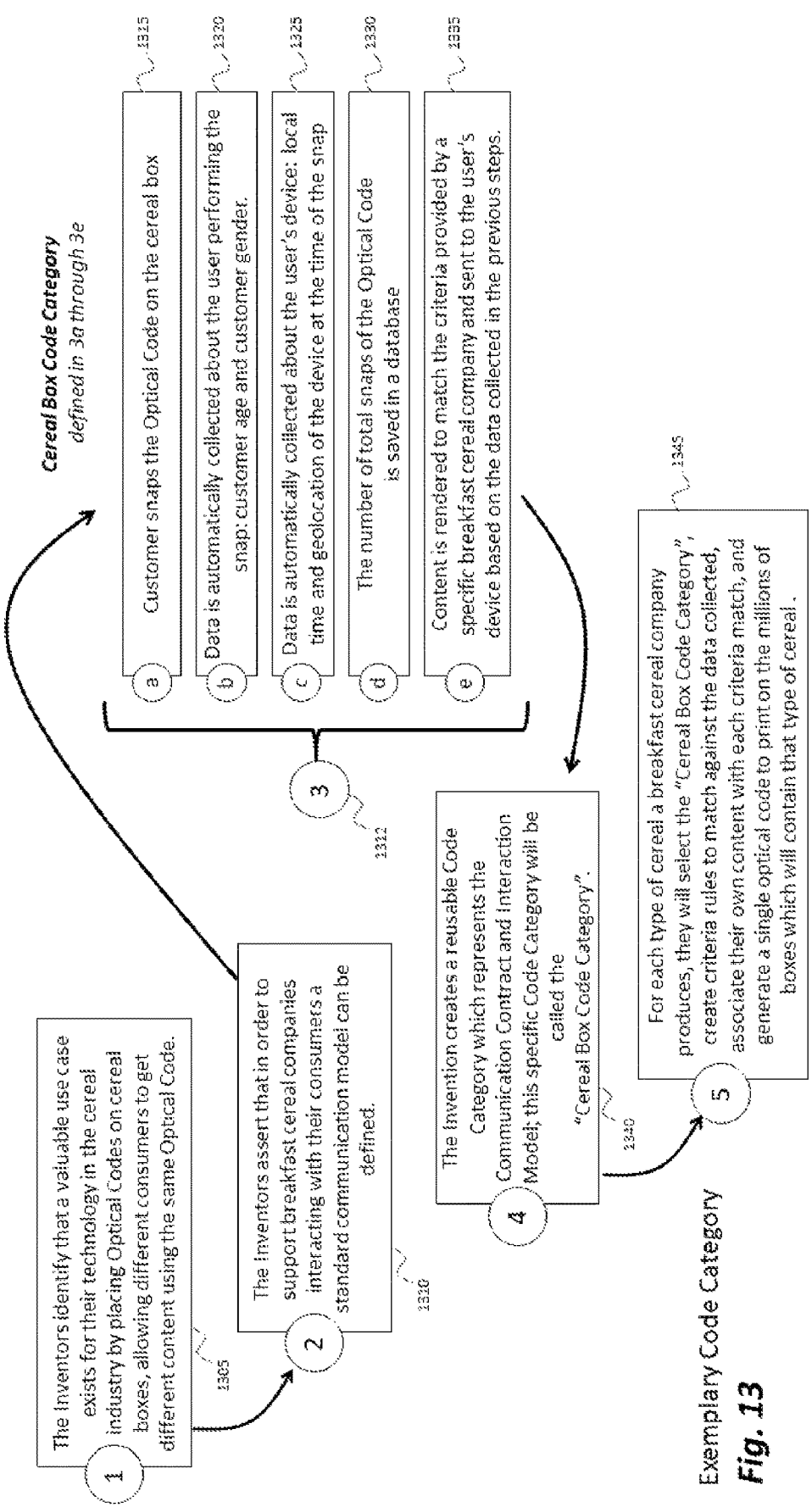
FIG. 13 depicts an exemplary Code Category demonstrating efficiency gained through the reuse of a standard Communications Contract for variable user interactions based a cereal box scenario.

FIG. 13 diagrams an exemplary Code Category used to represent a standard cereal box interaction model based on the user's (aka consumer's) age, gender, and location. In [1305] outlines that the Invention can be applied to cereal boxes, but this is representative of an unlimited number of applications. Cereal boxes, pizza boxes, greeting cards, vending machines, restaurant tables, and several other applications exist, and each would have their own unique Code Category so that consumer interaction model can be defined and reused for each. In FIG. 13, the purpose is to outline one of those types, the cereal box type, and how many cereal companies can use the same Code Category to quickly create QR Codes and associated their content without having to define a Communication Contract for each. In [1310] it is noted that the same Code Category can be used to define the Communication Contract for consumers interacting with cereal boxes. In [1312], the expected interaction model and required data is outlined within the Communication Contract. This is how consumers are expected to interact with cereal boxes and how the Invention is expected to communicate with the individual and their computing device. In [1315] the consumer (aka customer) will snap the Optical Code found on the cereal box. After the Optical Code's Code Category is found, in [1320] the age and gender will be collected from the consumer's profile. In [1325] the local time and geolocation of the computing device will be collected as defined by the Communication Contract. In [1330] the number of total snaps across all consumers will be incremented and saved in the system database. In [1335] content will be varied and customized based on the data collected in [1315] through [1330]. In [1340] the outlined Communication Contract will be saved as a Code Category with the specific name "Cereal Box Code Category" which can be used to later look up this type of Code Category and its Communication Contract. In [1345] each kind of cereal that a cereal company makes can have its own Optical Code and each Optical Code will be associated with the "Cereal Box Code Category" Code Category. Instead of recreating an entire communication model for each, the Code Category allows for quick reuse. The Cereal Box company will only supply the age, genders, geolocations, and variable content for the match rules. This is a great improvement over the existing models today where different Optical Codes would be needed to render variable experiences and individual communication models would be required to facilitate data collection and user interaction.

In the data required to perform the Controlled Access rule check will be retrieved. In [1135] a CUSTOMIZE CONTENT Action will be performed where the Controlled Access rules will be executed in [1140]. If the Receiver matched the Controlled Access rule criteria, then they will receive the appropriate type of Customized Content in [1145]. This is another view on how the present invention provides the ability to use a single Optical Code and regulate variable content for individuals based on Controlled Access rules, Code Category configuration, and Customized Content.

The present invention provides a method for the optical code to include one number, letter or symbol (e.g., an ASCII or Unicode character) positioned with one reference point. The present invention provides a method for the optical code to include two to twenty numbers positioned with or between three reference points. The present invention provides a method for the optical code to include two to twenty letters positioned with or between three reference points. The present invention provides a method for the optical code to include two to twenty symbols (e.g., ASCII or Unicode character) positioned with or between three reference points. The present invention provides a method for the optical code to include of a combination of two to twenty numbers, letters or symbols (e.g., ASCII or Unicode character) positioned with or between three reference points.

While the invention has been shown and described in exemplary forms, it will be apparent to those skilled in the art that many modifications, additions, and deletions can be made therein without departing from the spirit and scope of the invention as defined by the following claims.

What is claimed:

1. A method of providing controlled access to content based upon the data collected, comprising the verification status, and based on the authorization rules associated with the decoded value from scanned optical code comprising the steps of:
   a. configuring the system so that upon scanning an optical code, the system renders the verification status of the decoded value from the scanned optical code and further performs a predefined action, comprising the automatically opening of a link, based on the data collected, comprising the verification status, and in accordance with the authorization rules associated with the decoded value from the optical code;
   b. decoding the value from the scanned optical code and rendering a verification status, comprising verified, based on the data collected, comprising external systems data, and in accordance with the authorization rules associated with the decoded value from the scanned optical code;
   c. communicating the verification status, comprising words, symbols, images, sounds, and or colors, upon decoding the value from the scanned optical code in accordance with the authorization rules associated with the decoded value from the scanned optical code;
   d. providing the system, the ability to eliminate the tapping of the mobile device by automatically opening a link or launching an action based on the verification status of the decoded value from the scanned optical code and in accordance with the authorization rules associated with the decoded value from the optical code;
   e. granting access to the content associated with the decoded value from the scanned optical code in accordance with the authorization rules inclusive of the rules related to the verification status; and based on the data collected, comprising the verification status of the decoded value from the scanned optical code, the data about the decoded value of the optical code, the user's profile data, metadata about the user, data from the user's computing device, metadata pertaining to the user's computing device, publisher data, metadata pertaining to the publisher, the system data, and or external systems data; wherein the content comprises data, information, executable commands, transactions, and or payments.

2. The method of claim 1, wherein the system can be configured so that upon scanning an optical code, the system checks for the verification status of the decoded value from the scanned optical code and automatically trigger an action comprising the opening of a file, accessing a website, launching an application, executing predefined steps, and or launching third-party systems inclusive of data, electronic devices, and or mechanical devices based on the verification status and in accordance with the authorization rules associated with the decoded value from the scanned optical code.

3. The method of claim 1, wherein the system can be configured to allow the verification status to be determined based on data collected, comprising the data about the decoded value of the optical code, user's profile data, metadata about the user, data from the user's computing device, metadata pertaining to the user's computing device, publisher data, metadata pertaining to the publisher, the system data, and or external systems data.

4. The method of claim 1, wherein rendering a verification status of the decoded value from the scanned optical code, comprises the process of looking up the decoded value from the scanned optical code and matching the decoded value to a unique ID or a unique keys stored by one or more systems.

5. The method of claim 1, wherein the system can be configured to personalize, grant access, or deny access to content associated with the decoded value from the scanned optical code in accordance with the authorization rules inclusive of the rules related to the verification status; and based on the data collected, comprising the verification status of the decoded value from the scanned optical code, the data about the decoded value of the optical code, the user's profile data, metadata about the user, data from the user's computing device, metadata pertaining to the user's computing device, publisher data, metadata pertaining to the publisher, the system data, and or external systems data; wherein the content comprises data, information, executable commands, transactions, and or payments.

6. The method of claim 1, wherein the system can be configured to allow the verification status to be determined, provided, or altered by the system, one or more systems, a tenant of the system and or a user of the system in accordance with authorization rules.

7. The method of claim 1, wherein the verification status comprises statuses and rules that can be augmented, modified, and or deleted.

8. The method of claim 1, wherein the system can be configured to vary the communication., comprising words, symbols, images, sounds, and or colors based upon the verification status of the decoded value from the scanned optical code in accordance with the authorization rules inclusive of rules related to the verification status.

9. The method of claim 1, wherein a content publisher which supplies content having an optical code associated with the content and having the optical code placed on a physical object, comprising a published document, or displayed via an electronic screen; and upon scanning the optical code with a computing device is granted access or denied access to content, comprisinq customized content and, wherein customized content, comprises the user's settings used to reset and or initialize a mechanical or and electrical device and, wherein content or customized content is based on the data collected, comprising the verification status of the decoded value from the scanned optical code, the data about the decoded value of the optical code, the users profile data, metadata about the user, data from the user's computing device, metadata pertaining to the user's computing device, publisher data, metadata pertaining to the publisher, the system data, and or external systems data.

10. The method of claim 1, wherein the system is configured to decode the value from an optical code and render a verification status based on the data collected, comprising geolocation data and or encryption data about the unique key associated with the scanned optical code to provide controlled access to content in accordance with the authorization rules associated with the decoded value from the scanned optical code; and thereby enabling the prevention of fraudulent and malicious acts.

11. The method of claim 1, wherein unique keys and or unique IDs are generated by one or more systems and stored in one or more repositories and or servers, wherein upon decoding the unique key and or unique ID from the scanned optical code, a verification status, comprising verified, is rendered based on founding a match to a unique key or unique ID stored in one or more of the repositories and or servers authorized for the verification, further in accordance with the authorization rules associated with the decoded value from the scanned optical code, and based on data collected, comprising publisher data; and thereby the rendering of the verification statuses, provides a trusted source of information, alerts, and warning to enable the prevention of fraudulent and malicious acts.

12. The method of claim 1, wherein the system can be configured to allow controlled access, comprising a parent granting a child controlled access to content based on the verification status and further based on data collected about the a unique ID or unique key, wherein upon scanning an optical code, the system will only grant access to content based on the authorized verification status and or data collected, comprising data about the unique ID or unique key in accordance with the authorization rules associated with the decoded value from the scanned optical code and, wherein the content comprises data, information, executable commands, transactions, and or payments.

13. The method of claim 1, wherein the system is configured to allow an authorized user, comprising a parent, the ability to provide controlled access to content based on incentives, comprising reward points, wherein permitting a user, comprising a child, controlled access to content based on data collected, comprising reward points, wherein upon scanning an optical code, the system will grant or deny access to content associated with the decoded value from the scanned optical code based on data collected, comprising reward points, and in accordance with the authorization rules associated with the decoded value from the scanned optical code and, wherein the content comprises data, information, executable commands, transactions, and or payments.

14. The method of claim 1, wherein the system is configured to preform actions in a faster and safer way, wherein the actions comprises taking attendance, registering, and or checking-in a registered user of the system, comprising a customer, wherein the system is configured to automatically open a file and or launch an application upon rendering a successful verification status from the scanned optical published by the system and based on the data collected, comprising the data about the decoded value of the optical code, the user's profile data, metadata about the user, data from the user's computing device, metadata pertaining to the user's computing device, publisher data, metadata pertaining to the publisher, the system data, and or external systems data; and in accordance with the authorization rules associated with the decoded value from the scanned optical code.

15. The method of claim 1, wherein the system, one or more systems, and or external systems are configured with ability to make payments worldwide, upon scanning an optical code generated by any or all systems configured for payment, wherein the optical code is scanned by a registered user of an authorized system configured for payment and, wherein a system and or an external system is granted or denied authorization for payment based on data collected, comprising the verification status, and in accordance with the authorization rules associated with the decoded value of the scanned optical code.

16. The method of claim 15, wherein one or more systems and or external systems are configured to generate and publish optical codes for payments, wherein a published optical code is associated with a unique key, wherein a unique key is associated with a unique identifier, comprising a merchant ID, wherein a registered user of an authorized system and or external system can pay merchants associated with one or more authorized systems worldwide and, wherein transmitting tokenized payment data via a system and or external associated with a merchant ID for payment requires a registered user with a scanning device to scan such optical code, and upon the scan, the rendering of a successful verification status in accordance with the authorization rules associated with the decoded value from the scanned optical code, and wherein the authorization rules, comprises rules supplied by the card networks, inclusive of rules related to personal identification number.

17. The method of claim 16, wherein one or more systems are configured to communicate between systems via a software interface, wherein such system that is not associated with the merchant ID can scan an optical code associated with the merchant ID and upon the scan, the tokenized payment data of the registered user of such system is captured and transmitted to the payment processor by the system associated with such merchant ID, based on the data collected, comprising the verification status and further in accordance with the authorization rules and, wherein the authorization rules, comprises rules supplied by the payment processor and or card networks.

18. The method of claim 15, wherein the system and or systems are configured to assign a unique system ID to each system and or tenants of a system to enable controlled access to payment based on the verification, comprising the verification status of the unique key, unique ID, and or unique system ID and wherein, the verification status process, comprises looking up the decoded value from the scanned optical code and matching the decoded value to a unique key or unique ID stored by one or more repositories, servers and or systems, accessing the authorization status of the unique system ID upon decoding of the value from the scanned optical, and or rendering a verification status from the scanned optical code based on the data collected, comprising data about the unique system ID and in accordance with the authorization rules, comprising rules supplied by one or more payment processors and or card networks.

19. The method of claim 18, wherein one or more of the systems, comprises a multi-tenant system, wherein each system and or tenant of the system is associated with one or more unique identifiers, comprising a system ID, account number, merchant ID, email, and or phone number that is further associated with the customer's tokenized payment data to facilitate controlled access to payments upon scanning an optical code and in accordance with authorization rules, comprising the rules associated with the decoded valued from the scanned optical code, and based on data collected, comprising device data.

20. A computer storage medium storing computer-readable instructions and data comprising:
    a database and or server for storing programmed instructions, communication contracts, and authorization rules;
    a repository, and or server for storing of unique keys, unique system Ds, and or unique IDs for rendering verification statuses;
    a methodology for creating configurations for programmed instruction, creating and modifying content, setting and connecting to external systems, creating and associating unique keys, producing and associating optical codes, and printing and saving optical codes;
    a methodology for creating and assigning a unique key, searching for unique key, retrieving associated data and processing programmed instructions, associating and reassociating subroutines containing predefined steps to include programmed sequencing, varying and altering functionalities, allowing communication with computing devices and external systems in accordance with authorization rules, which include rules for verifying unique keys, rules for controlled access, and rules for viewing, accessing, altering, varying, or modifying content; and delivering content to computing devices or third party applications to include execution of third party mechanical and or electrical devices in accordance with predefined actions and in accordance with the authorization rules;
    a methodology for storing unique IDs, comprising unique keys, sharing data, and or exchanging data between systems and or external systems in accordance with the authorization rules and based on data collected, comprising data about the unique key;
    a methodology for determining the verification status of the decoded value from a scanned optical code, comprising the process of looking up the decoded value from the scanned optical code and matching the decode value to a unique ID or a unique key stored by one or more repositories, servers and or systems;
    a methodology for determining the verification status of a unique system ID, comprising the process of successfully collecting the system ID from the registered user's device upon decoding the value from the scanned optical code and matching the system ID to a system ID stored by one or more repositories, servers and or systems;
    a methodology for determining the verification status upon decoding the value from the scanned optical code based on data collected, comprising the data about the decoded value of the optical code and or system ID, the user's profile data, metadata about the user, data from the user's computing device, metadata pertaining to the user's computing device, publisher data, metadata pertaining to the publisher, the system data, and or external systems inclusive of payment processors and or card networks; and in accordance with the authorization rules associated with the decoded value from the scanned optical code;
    a methodology for controlling the opening of a file or the launching of an application based on the verification status, authorization rules, and or data collected, comprising geolocation;
    a methodology for collecting data about a unique key, system ID and or unique ID associated with the scanned optical code inclusive of encryption data and or geolocation data;
    a methodology for communicating between systems to enable systems that are not associated with the merchant ID to scan an optical associated with the merchant ID and upon the scan, the tokenized payment data of the registered user of such system is captured and transmitted to the payment processor by the system associated with such merchant ID based on the data collected, comprising the verification status; and
    wherein the computer storage medium is loaded onto a server computer connected to a communication network, concurrently multiple users can scan a single optical code with a computing device and have controlled access to content, customized content, or the same content per viewing using the same optical code.

* * * * *